US011859833B2

(12) United States Patent
Ogawa et al.

(10) Patent No.: US 11,859,833 B2
(45) Date of Patent: Jan. 2, 2024

(54) CONTROL DEVICE, CONTROL METHOD FOR WATER HEATER, AND PROGRAM

(71) Applicant: Mitsubishi Electric Corporation, Tokyo (JP)

(72) Inventors: Yuki Ogawa, Tokyo (JP); Masaaki Yabe, Tokyo (JP); Masayuki Komatsu, Tokyo (JP); Satoshi Minezawa, Tokyo (JP); Akihiro Toda, Tokyo (JP); Takashi Arai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/970,303

(22) Filed: Oct. 20, 2022

(65) Prior Publication Data

US 2023/0038111 A1 Feb. 9, 2023

Related U.S. Application Data

(62) Division of application No. 15/759,552, filed as application No. PCT/JP2015/086274 on Dec. 25, 2015, now Pat. No. 11,519,612.

(51) Int. Cl.
*F24D 19/10* (2006.01)
*H02J 3/00* (2006.01)
(Continued)

(52) U.S. Cl.
CPC ..... *F24D 19/1048* (2013.01); *F24D 19/1063* (2013.01); *H02J 3/003* (2020.01);
(Continued)

(58) Field of Classification Search
CPC ............. F24D 19/1039; F24D 19/1048; F24D 19/1063; F24D 19/1072; F24D 19/1075;
(Continued)

(56) References Cited

U.S. PATENT DOCUMENTS

2004/0070280 A1* 4/2004 Nakata ............... H02J 3/46
307/69
2011/0213606 A1* 9/2011 Seaman ............... H02J 3/00
703/18
(Continued)

FOREIGN PATENT DOCUMENTS

EP 2 375 528 A2 10/2011
EP 2 773 008 A1 9/2014
(Continued)

OTHER PUBLICATIONS

International Search Report of the International Searching Authority dated Mar. 22, 2016 for the corresponding international application No. PCT/JP2015/086274 (and English translation).
(Continued)

*Primary Examiner* — Steven B McAllister
*Assistant Examiner* — Benjamin W Johnson
(74) *Attorney, Agent, or Firm* — POSZ LAW GROUP, PLC

(57) ABSTRACT

In a control device, an instruction acquirer acquires an instruction to suppress in a specified period supplying of generated power generated by power generator installed in a power-consuming area to a commercial electrical power system. Upon the instruction acquirer acquiring the instruction, a water heater controller commands a water heater installed in the power-consuming area to perform a water heat-up operation when a predetermined condition is satisfied in the specified period.

6 Claims, 14 Drawing Sheets

(51) Int. Cl.
*H02J 3/38* (2006.01)
*H02J 3/28* (2006.01)
*H02J 3/46* (2006.01)

(52) U.S. Cl.
CPC .......... *H02J 3/381* (2013.01); *F24D 19/1039* (2013.01); *F24D 19/1072* (2013.01); *F24D 19/1075* (2013.01); *F24D 2200/02* (2013.01); *H02J 3/28* (2013.01); *H02J 3/388* (2020.01); *H02J 3/466* (2020.01); *H02J 2300/24* (2020.01); *H02J 2310/12* (2020.01); *Y02B 10/20* (2013.01); *Y02B 70/3225* (2013.01); *Y02E 10/56* (2013.01); *Y04S 20/222* (2013.01)

(58) Field of Classification Search
CPC ......... F24D 2200/02; H02J 3/003; H02J 3/28; H02J 3/381; H02J 3/388; H02J 3/466; H02J 2300/24; H02J 2310/12; Y02B 10/20; Y02B 70/3225; Y02E 10/56; Y04S 20/222
USPC ....................................... 122/14.1
See application file for complete search history.

(56) References Cited

U.S. PATENT DOCUMENTS

| | | | | |
|---|---|---|---|---|
| 2012/0203387 | A1* | 8/2012 | Takayama | H02J 7/34 700/291 |
| 2012/0235478 | A1 | 9/2012 | Hayashida | |
| 2012/0259723 | A1* | 10/2012 | Ansari | H02J 3/381 705/26.1 |
| 2014/0222237 | A1* | 8/2014 | Hibiya | H02J 3/14 700/295 |

FOREIGN PATENT DOCUMENTS

| | | |
|---|---|---|
| JP | 2004-194485 A | 7/2004 |
| JP | 2009-268247 A | 11/2009 |
| JP | 2010-011705 A | 1/2010 |
| JP | 2011-004476 A | 1/2011 |
| JP | 2013-110951 A | 6/2013 |
| JP | 2015-106937 A | 6/2015 |
| JP | 2015-233413 A | 12/2015 |
| WO | 2012/090365 A1 | 7/2012 |

OTHER PUBLICATIONS

Extended EP Search Report dated Nov. 8, 2018 for the corresponding EP patent application No. 15911384.4.
Office Action dated Jan. 8, 2019 for the corresponding JP patent application No. 2017-557627 (and English translation).
Office Action dated Oct. 8, 2019 for the corresponding CN patent application No. 201580085138.9 (and partial English translation).
Office Action dated Nov. 28, 2019 for the corresponding EP patent application No. 15911384.4.
Office Action dated Feb. 18, 2020 for the corresponding EP patent application No. 15911384.4.
Office Action dated Jul. 13, 2020 for the corresponding CN patent application No. 201580085138.9 ( and English translation).
Office Action dated Feb. 9, 2021 for the corresponding EP patent application No. 15911384.4.

* cited by examiner

FIG.6

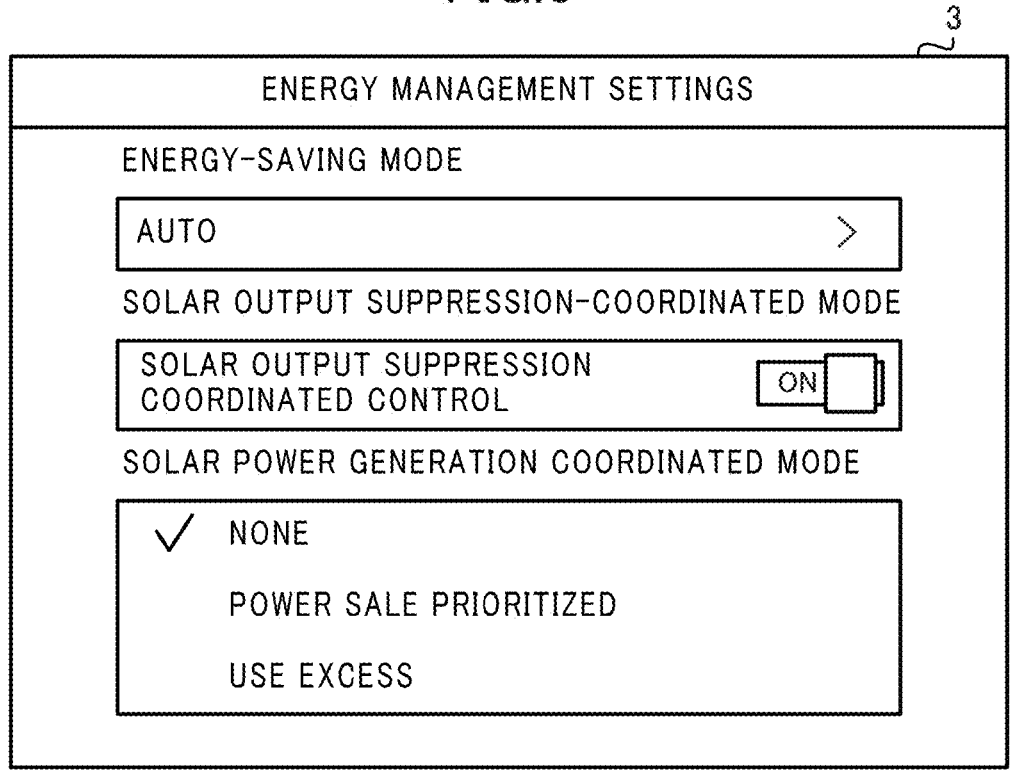

ENERGY MANAGEMENT SETTINGS

ENERGY-SAVING MODE

AUTO >

SOLAR OUTPUT SUPPRESSION-COORDINATED MODE

SOLAR OUTPUT SUPPRESSION COORDINATED CONTROL — ON

SOLAR POWER GENERATION COORDINATED MODE

✓ NONE

POWER SALE PRIORITIZED

USE EXCESS

FIG.7

| MEASUREMENT DATE-24-HOUR TIME | SOLD POWER AMOUNT (Pb) [Wh] | POWER GENERATOR OUTPUT POWER AMOUNT (Pg) [Wh] | TOTAL CONSUMED POWER AMOUNT (Pc=Pb+Pg) [Wh] | WATER HEATER CONSUMED POWER AMOUNT (Pe) [Wh] |
|---|---|---|---|---|
| 2015 10/25 12:00:00 | 3021 | 1081 | 4102 | 121 |
| 2015 10/25 12:30:00 | 2981 | 1279 | 4260 | 145 |
| 2015 10/25 13:00:00 | 3015 | 1150 | 4165 | 132 |
| ⋮ | ⋮ | ⋮ | ⋮ | ⋮ |

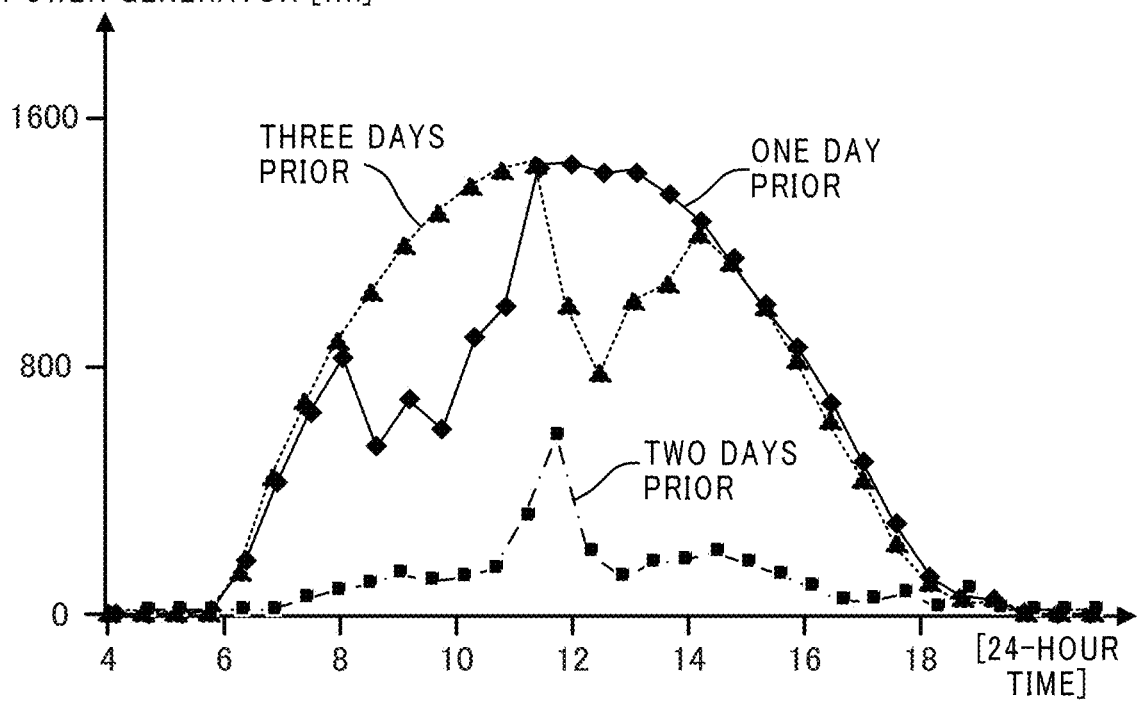

CONTROL DEVICE, CONTROL METHOD FOR WATER HEATER, AND PROGRAM

CROSS REFERENCE TO RELATED APPLICATIONS

This application is a divisional application of U.S. Utility application Ser. No. 15/759,552 filed on Mar. 13, 2018, which is a U.S. national stage application of International Patent Application No. PCT/JP2015/086274 filed on Dec. 25, 2015, the disclosure of which is incorporated herein by reference.

TECHNICAL FIELD

The present disclosure relates to a control device, a control method for a water heater, and a program.

BACKGROUND ART

Technology using natural energy as typified by photovoltaic energy and wind energy is attracting attention in recent years, and with increasing frequency, the power consumer owns a power generator that generates power from the natural energy. Such a power consumer can consume the power generated by the power generator, and can supply excess power to the commercial electrical power system and sell the excess power to an electric utility operator. Thus the power consumer can decrease the power purchased from the commercial electrical power system and can obtain an economic benefit.

However, a supply-demand imbalance may occur in the commercial electrical power system due to the reverse flow supplying power back to the commercial electrical power system from the power generator of the power consumer. For example, when the weather is clear on a non-workday, the demand for power from the commercial electrical power system decreases, and also the power supplied to the commercial electrical power system from the power generator of the power consumer increases.

Thus in order to maintain the supply-demand balance of the commercial electrical power system, electric utility operators are promoting the maintaining of a system for prior designation of time periods to the power consumer for suppressing the reverse flow of power. For example, the Agency for Natural Resources and Energy of Japan in 2014 announced rules for control of the output from photovoltaic power generation. These output control rules are for adjusting the output of power generated by a power generator, thereby suppressing the sale of power from the power consumer to the commercial electrical power system.

Further, technology is proposed for consuming the generated power as much as possible by the power consumer and decreasing the sale of the generated power to the commercial electrical power system. For example, Patent Literature 1 discloses technology for predicting a time period when much reverse flow of power is generated, and in the forecast time period, causing operation of a heat pump-type water heater device equipped with a hot water storage tank. Power consumption by the water heater equipped with the hot water storage tank is generally high, and thus the technology disclosed in Patent Literature 1 can effectively decrease the reverse flow of power.

CITATION LIST

Patent Literature

Patent Literature 1: International Publication No. WO 2012/090365

SUMMARY OF INVENTION

Technical Problem

However, the technology disclosed in Patent Literature 1 does not, in the aforementioned manner, decrease the reverse flow of power in response to an instruction to suppress the reverse flow of power. In the period designated for suppressing the reverse flow of power, a power generation loss occurs due to the suppression of output of power generated by the power generator. Thus there is demand for increasing utilization efficiency of power and decreasing the power generation loss occurring in the period designated for suppression of the reverse flow of power.

In order to solve the above described problem, an object of the present disclosure is to provide a control device and the like capable of causing an improvement of the utilization efficiency of power.

Solution to Problem

In order to attain the aforementioned objective, the control device according to the present disclosure includes:
  instruction acquiring means for acquiring an instruction to suppress in a specified period supplying of a generated power generated by a power generator installed in a power-consuming area to a commercial electrical power system; and
  water heater control means for, upon the instruction acquiring means acquiring the instruction, commanding a water heater installed in the power-consuming area to perform a water heat-up operation when a predetermined condition is satisfied in the specified period.

Advantageous Effects of Invention

According to the present disclosure, in the case in which the instruction to suppress in the specified period supplying of generated power generated by the power generator installed in the power-consuming area to the commercial electrical power system is acquired, when a predetermined condition is satisfied in the specified period, the water heater installed in the power-consuming area is commanded to perform the water heat-up operation. Thus the present disclosure enables an improvement in the utilization efficiency of power.

BRIEF DESCRIPTION OF DRAWINGS

FIG. 6 is a drawing illustrating an example of a setting screen displayed by an operating terminal;

FIG. 7 is a table illustrating an example of a power database;

FIG. 9 is a chart illustrating transitioning in measured values of an output power amount from the power generator occurring in a three day period prior to a day of execution of the suppression of PV power;

FIG. 10 is a chart illustrating trends in maximum values among the measured values of the output power amount from the power generator occurring in the three day period prior to the day of execution of the suppression of PV power;

DESCRIPTION OF EMBODIMENTS

Figure 1:
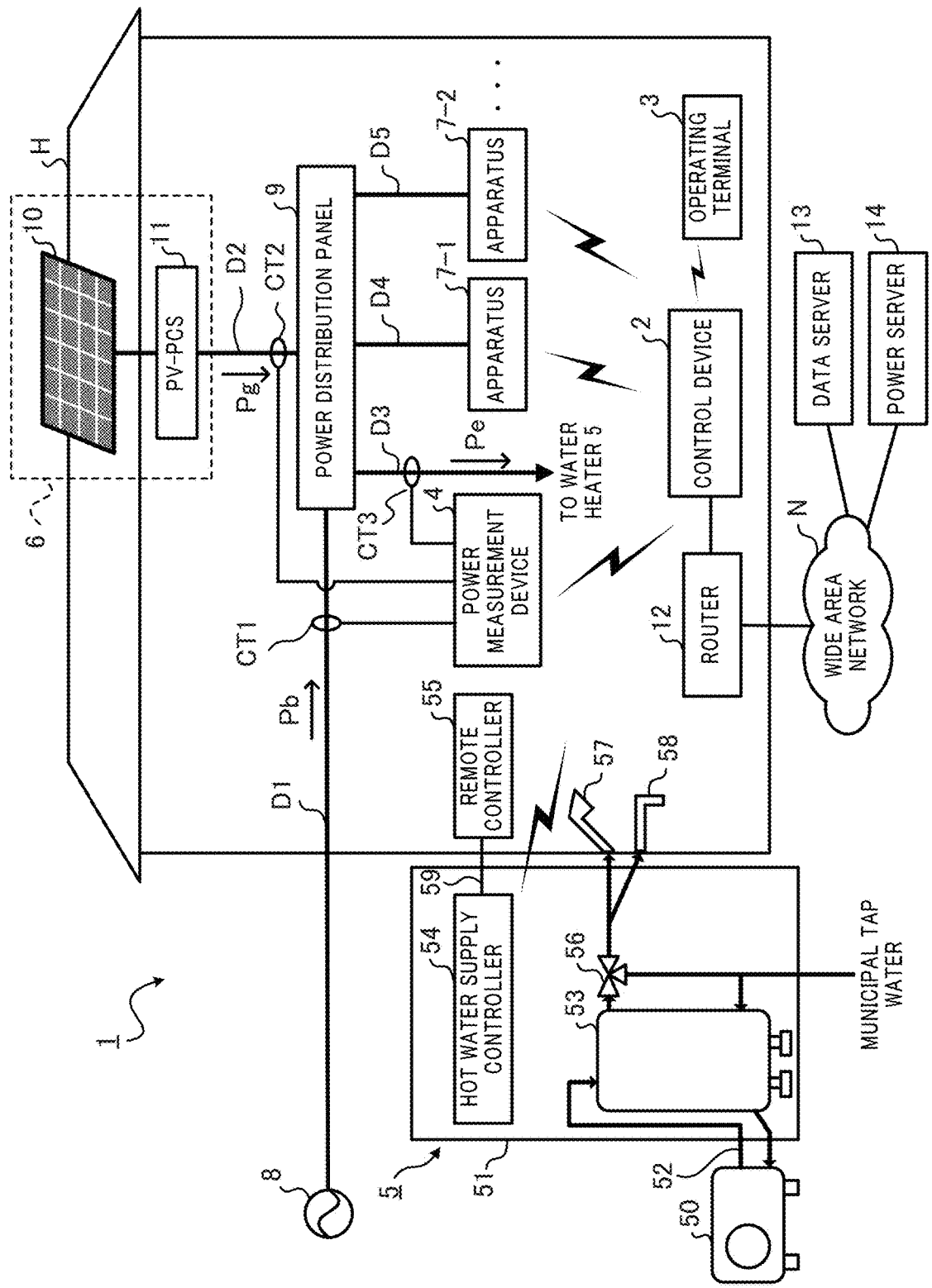
FIG. 1 is a diagram illustrating an overall configuration of an energy management system according to an embodiment of the present disclosure.

Embodiments of the present disclosure are described below in detail with reference to drawings. In the drawings, components that are the same or equivalent are assigned the same reference signs.

FIG. 1 illustrates an overall configuration of an energy management system 1 according to an embodiment of the present disclosure. The energy management system 1 is a system termed a home energy management system (HEMS) that performs management of power used in a general household. The energy management system 1 includes a control device 2, an operating terminal 3, a power measurement device 4, a water heater 5, and a power generator 6. Further, the control device 2 is connected to a power server 14 and a data server 13 via a wide area network N.

The control device 2 is arranged at a suitable location within a home H, which is a power-consuming area for consumption of power, monitors power consumed in the home H, and displays a power consumption state via the operating terminal 3. Further, the control device 2 controls operation of the water heater 5 and multiple apparatuses 7 (apparatuses 7-1, 7-2, and the like), and monitors operational states of these components. The control device 2 is described in detail hereinafter.

The operating terminal 3 (user interface device) is a portable apparatus such as a smartphone, tablet terminal, remote controller, portable phone, or notebook-type personal computer, for example. The operating terminal 3 includes an input device such as a touch panel, touch pad, or push button, a display device such as an organic electroluminescence (EL) display or a liquid crystal display, and a communication interface. The operating terminal 3 performs communication with the control device 2 according to a widely known communication protocol such as Wi-Fi (registered trademark), Wi-SUN (registered trademark), a wired local area network (LAN), or the like. The operating terminal 3 receives an operation from a user, and transmits to the control device 2 information indicating content of the received operation. Further, the operating terminal 3 receives from the control device 2 information to be presented to the user, and displays the received information. In this manner, the operating terminal 3 serves as an interface (user interface) with the user.

The power measurement device 4 measures values of power sent to each of power lines D1 to D3 arranged in the home H. The power line D1 is arranged between a commercial electrical power system 8 and a power distribution panel 9, the power line D2 is arranged between the power generator 6 and the power distribution panel 9, and the power line D3 is arranged between the power distribution panel 9 and the water heater 5. The power measurement device 4 is connected through communication lines to a CT1 (CT means "current transformer" hereinafter) connected to the power line D1, a CT2 connected to the power line D2, and a CT3 connected to the power line D3. CT1 to CT3 are sensors that measure alternating current.

The CT1 installed at the power line D1 measures a power Pb supplied from the commercial electrical power system 8 to the home H. This power Pb corresponds to power (purchased power) purchased from the electric utility operator by the power consumer that consumes power in the home H. The CT2 installed at the power line D2 measures a power Pg output to the power distribution panel 9 from the power generator 6. This power Pg is power generated by the power generator 6 and corresponds to power supplied within the home H and capable of use within the home H. The CT3 installed at the power line D3 measures a power Pe supplied to the water heater 5 from the distribution panel 9. This power Pe corresponds to power consumed by the water heater 5.

Further, if no power storage equipment such as a stationary type storage battery or an electric vehicle is arranged, a sum of the power Pb measured by the CT1 and the power Pg measured by the CT2 corresponds to total consumed power of the home H that is the power-consuming area. That is to say, the following relationship is established for the total consumed power of the home H: Pc=Pb+Pg. Further, the expression "total consumed power of the home H" is taken to include power consumed within the grounds of the home H. Hereinafter, the total consumed power is sometimes referred to simply as "consumed power".

When the power Pg output from the power generator 6 exceeds the total consumed power Pc of the home H, excess power occurs at the home H. When excess power occurs, the power consumer of the home H can sell power to the electric utility operator by supplying the excess power to the commercial electrical power system 8 as reverse flow power. The power returned to the electric utility operator from the power consumer by the supply of power from the home H to the commercial electrical power system 8 is referred to as the "reverse flow power". During the period of occurrence of the reverse flow power, the power Pb of the power line D1 measured by CT1 is a negative value.

The power measurement device 4 includes non-illustrated components such as a CPU, a ROM, a RAM, a communication interface, read-writeable non-volatile semiconductor memory, and the like. Further, the power measurement device 4 includes a wireless communication interface and communicates with the control device 2 via a wireless network installed in the home H. The wireless network is a network standardized on the Energy Conservation and Homecare Network Lite (ECHONET Lite), for example. Further, the power measurement device 4 may be configured to connect to this wireless network through a non-illustrated external communication adapter.

In response to the request from the control device 2, the power measurement device 4 generates measurement data containing, as measurement values, power sent through the power lines D1 to D3 and obtained by measurement, and transmits the generated measurement data to the control device 2. Equipment unit addresses of the power measurement device 4, IDs of the power lines, measurement times, and the like are contained in the transmitted measurement data. Further, in response to the request from the control device 2, the power measurement device 4 may generate, and then transmit to the control device 2, measurement data that collectively contains each of the measurement values of the power lines D1 to D3.

The apparatus 7 (apparatuses 7-1, 7-2, and the like) is an electrical apparatus such as an air conditioner, lighting appliance, floor heating system, refrigerator, induction heating (IH) cooker, or television, for example. The apparatuses 7-1, 7-2, and the like are arranged within the home H (including the grounds thereof), and are electrically connected to the commercial electrical power system 8 and the power generator 6 via the power lines D4, D5, and the like branching from the power distribution panel 9.

Each of the apparatuses 7 includes a wireless communication interface and communicates with the control device 2 via the aforementioned wireless network installed in the home H. Further, each of the apparatuses 7 may be configured to connect with the wireless network via a non-illustrated external communication adapter. In response to a request from the control device 2, each of the apparatuses 7 sends to the control device 2, via the wireless network, data (operational state data) containing information indicating an equipment identification (ID), a present time, and an operational state.

The water heater 5 is a hot water storage-type water heater including a heat pump unit 50 and a tank unit 51. The heat pump unit 50 and the tank unit 51 are interconnected by piping 52 through which hot water flows. The water heater 5 is electrically connected to the commercial electrical power system 8 and the power generator 6 via the power line D3 branching from the power distribution panel 9. The water heater 5 is described hereinafter.

Heat Pump Unit 50

The heat pump unit 50 of the water heater 5 includes non-illustrated components such as a compressor, a first heat exchanger, an expansion valve, a second heat exchanger, an air fan, and a control board. The compressor, the first heat exchanger, the expansion valve, and the second heat exchanger are connected in a loop to a cooling cycle circuit for circulation of a refrigerant. The cooling cycle circuit is also termed the "refrigerant circuit".

The compressor compresses the refrigerant and causes increases in temperature and pressure. The compressor includes an inverter circuit that can change a capacity (output amount per unit) in response to a drive frequency. The compressor changes the aforementioned capacity in accordance with an instruction from the control board.

The first heat exchanger is a heat source for heating to raise a temperature of municipal tap water up to a target heat-up temperature. The heat-up temperature is also referred to as the "hot water storage temperature". The first heat exchanger is a heat exchanger such as a plate type heat exchanger or a double-tube type heat exchanger, and performs the exchange of heat between the refrigerant and water, that is, low temperature water. Heat exchange at the first heat exchanger releases heat of the refrigerant, and causes the water to absorb heat and rise in temperature.

The expansion valve allows expansion of the refrigerant and causes a lowering of temperature and pressure. Degree of opening of the expansion valve changes in accordance with an instruction from the control board.

The second heat exchanger performs heat exchange between the refrigerant and exterior air blown by the fan. Due to the heat exchange by the second heat exchanger, heat absorbed by the refrigerant is released to the exterior air, and the temperature decreases.

The control board includes components such as a central processing unit (CPU throughout), a read only memory (ROM throughout), a random access memory (RAM throughout), a communication interface, and a read-writable non-volatile semiconductor memory. The control board is connected in a communication-capable manner via respective communication lines with the compressor, the expansion valve, and the fan, and the control board controls operation of these components. Further, the control board is connected in a communication-capable manner via non-illustrated communication lines with a below-described hot water supply controller 54 of the tank unit 51.

Tank Unit 51

The tank unit 51 includes the hot water storage tank 53, the hot water supply controller 54, a mixing valve 56, and the like. These components are contained within a metallic external case.

The hot water storage tank 53 is formed from a metal such as stainless steel or from a resin. Non-illustrated thermal insulation is arranged at the exterior of the hot water storage tank 53. Thus the high temperature hot water (referred to hereinafter as the high temperature water) within the hot water storage tank 53 can be maintained at temperature for a long time period.

The hot water supply controller 54 includes non-illustrated components such as a CPU, a ROM, a RAM, a communication interface, and a read-writable non-volatile semiconductor memory, and provides overall control of the water heater 5. The hot water supply controller 54 is connected in a communication-capable manner via a non-illustrated communication line with the control board of the heat pump unit 50. Further, the hot water supply controller 54 is connected in a communication-capable manner via the communication line 59 with a remote controller 55. Further, the hot water supply controller 54 is connected with the control device 2 in a communication-capable manner via the aforementioned wireless network installed in the home H.

Remote Controller 55

The remote controller 55 is a terminal device for displaying and providing to the user information such as an operational state and a hot water storage state of the water heater 5. The remote controller 55 is arranged in a bathtub-equipped room in the home H and receives from the user an operational input relating to heating up, hot water supply, or the like.

The remote controller 55 includes non-illustrated components such as a CPU, a ROM, a RAM, a read-writable non-volatile semiconductor memory, an input device such as a push button, a touch panel, or a touch pad, a display device such as an organic EL display or a liquid crystal display, and a communication interface, and the like.

Water Heat-Up Operation

At the start time of the water heat-up operation, the high temperature water within the hot water storage tank 53 is consumed, and the municipal tap water at a temperature close to that of low temperature water is retained in the bottom portion of the hot water storage tank 53. By operation of a non-illustrated pump, the low temperature water enters the first heat exchanger of the heat pump unit 50, the water is raised in temperature by exchange of heat with the refrigerant, and the water becomes high temperature water. This high temperature water is returned to the upper portion of the hot water storage tank 53, and within the hot water storage tank 53, the high temperature water in the upper portion thereof and the low temperature water remaining in the lower portion form temperature layers, and a temperature interface layer is formed between the high temperature water and the low temperature water.

When the heating up amount increases and the region of the high temperature water becomes large, the temperature interface layer approaches the bottom portion of the hot water storage tank 53, and the temperature (inlet water temperature) of the water entering the first heat exchanger gradually rises.

Hot Water Supply Operation

A hot water output pipe is connected to the upper portion of the hot water storage tank 53, and high temperature water discharged via the hot water output pipe from the hot water storage tank 53 is mixed with the municipal tap water by the mixing valve 56. Thus the resultant hot water has the temperature, such as 40° C., desired by the user, and is suppled to a hot water supply terminal such as a shower 57 or a faucet 58 installed in a bathtub-equipped room, for example. At this time, volume of the high temperature water discharged from the upper portion of the hot water storage tank 53 is equal to the volume of municipal tap water supplied by water pipe pressure from a non-illustrated water supply pipe connected to the bottom of the hot water storage tank 53. Thus the temperature interface layer within the hot water storage tank 53 moves upward. When the amount of the high temperature water becomes low, the water heater 5 performs additional heating up.

The power generator 6 is described next. The power generator 6 is installed at the home H and is equipment that generates electricity from sunlight, which is a natural energy source. Although the commercial electrical power system 8 supplies power to an undefined plurality of power-consuming areas including the home H, the power generator 6 is owned by a power consumer of a specific power-consuming area, and is arranged to supply power to the home H that is the specific power-consuming area. This type of power generator 6 is also referred to as a distributed-type power source.

The power generator 6 includes a photovoltaic (abbreviated throughout as "PV") panel 10 for PV power generation and a PV-power conditioning system (abbreviated throughout as "PCS") 11. The PV panel 10 is a solar panel such as a polycrystalline type solar panel, for example. The PV panel 10 is arranged upon a roof of the home H and generates photovoltaic power by conversion of solar energy into electrical energy.

The PV-PCS 11 receives the supplied power generated by the PV panel 10 and outputs the supplied power via the power line D2 to the power distribution panel 9. At this time, the PV-PCS 11 converts the power supplied from the PV panel 10 by converting and outputting at a prescribed conversion efficiency from direct-current power to alternating-current power so that the supplied power can be used within the home H.

The PV-PCS 11 includes non-illustrated components such as a CPU, a ROM, a RAM, a communication interface, and a read-writable non-volatile semiconductor memory. Further, the PV-PCS 11 communicates with the control device 2 via the aforementioned wireless network installed in the home H. Further, the PV-PCS 11 may be configured to connect with the wireless network via a non-illustrated external adapter. The PV-PCS 11 acquires from the control device 2 via the wireless network information such as PV suppression instructions and measurement values of the power Pb, Pg, and Pe transmitted through the power lines D1 to D3, respectively, and measured by the power measurement device 4.

A router 12 is a device capable of communication with the data server 13 and the power server 14 via the wide area network N, and is a broadband router, for example. The control device 2 communicates with the data server 13 and the power server 14 via the router 12.

The data server 13 is a server for allowing the energy management system 1 to function in cooperation with the control device 2, and is a server that provides resources such as cloud computing. The data server 13 stores data required for the operation of the control device 2. The data server 13 acquires and accumulates via the control device 2 information such as results of measurements by the power measurement device 4, operational states of the water heater 5 and the apparatuses 7 collected by the control device 2, and power consumed under the operational state, for example. Further, the data server 13 stores, time slot-by-time slot, a purchased-power unit price for power from the commercial electrical power system 8 and a sold-power unit price for the reverse flow power to the commercial electrical power system 8. Further, the data server 13 supplies data to the control device 2 in response to a request from the control device 2.

The power server 14 is a server operated by the electric utility operator who provides a commercial power supply to each of the power consumers via the commercial electrical power system 8. The power server 14 is connected in a communication-capable manner via the wide area network N with the control device 2 arranged in the power-consumption area of each of the power consumers.

Upon satisfaction of a predetermined condition, the power server 14, to each of the power consumers owning the power generator 6, distributes an instruction to suppress the supply of power to the commercial electrical power system 8 from the power generator 6 of the power consumer in the specified period, that is to say, distributes an instruction to suppress the reverse flow power. The reverse flow power is suppressed in this manner to prevent a supply-demand imbalance in the commercial electrical power system 8 due to an excess supply of power from the power consumers to the commercial electrical power system 8. The instruction distributed by the power server 14 to suppress the reverse flow power is referred to hereinafter as the "suppression instruction", and controlling the output of the power generator 6 to suppress the reverse flow power is referred to hereinafter as "PV suppression". PV suppression is also termed "output suppression", "output control", or the like.

That is to say, specifically the power server 14 acquires from a meteorological organization meteorological information such as weather information, solar insolation, sunlight hours, and the like for the location where the power generator 6 of each power consumer is installed, and creates a schedule for the PV suppression. Then by the day prior to execution of the PV suppression, the power server 14, in accordance with the created schedule, delivers the suppression instruction to each power consumer. The execution period of the PV suppression is the period when the generated power from the power generator 6 becomes excessive with respect to the supply-demand state of the commercial electrical power system 8, and for example, this period is normally in a time slot when the weather is clear and a large amount of solar insolation is anticipated. Further, the power server 14 does not deliver the suppression instruction with respect to a day for which there is no requirement for the execution of PV suppression.

The suppression instruction distributed by the power server 14 includes: time information indicating a specified period for execution of the PV suppression, and instruction value information indicating an instruction value of an output limit during suppression of the PV power of the power generator 6. That is to say, specifically the suppression instruction designates information that is a specified time slot occurring on a specified day as the specified period for execution of the PV suppression, that is to say, the year, month, day, and times of day (start time and end time) for execution of the PV suppression.

The suppression instruction designates, as the instruction value of the output limit of the power generator 6 during suppression of the PV power, a fraction (%) of the power output to the power distribution panel 9 of the home H from the PV-PCS 11 of the power generator 6 relative to the rated power of the power generator 6. Here, the term "rated power" of the power generator 6 means the safe maximum power possible under appropriate conditions for the power generator 6, and this specifically corresponds to the smaller capacity of the rated capacity of the PV panel 10 and the rated capacity of the PV-PCS 11.

Figure 2:
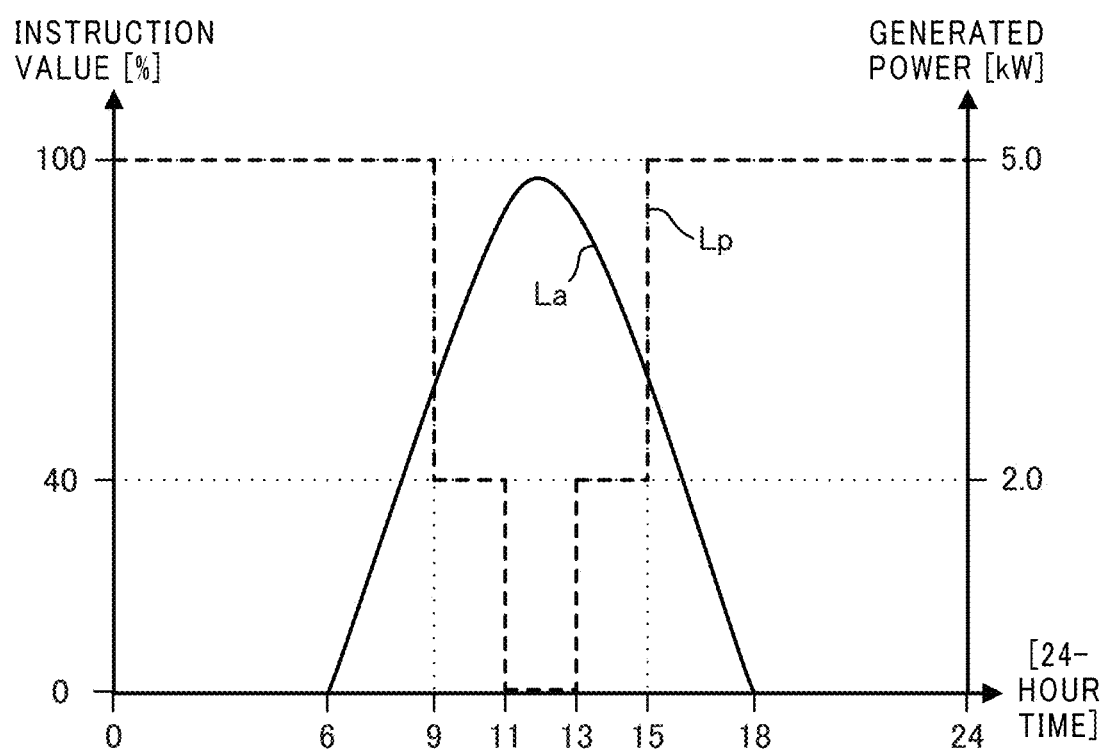
FIG. 2 is a chart and table for description of a suppression instruction distributed by a power server.

FIG. 2 illustrates a specific example of the suppression instruction distributed by the power server 14. The solid-line plot La within FIG. 2 indicates the transitioning of generated power from the power generator 6 occurring in the case in which there is no prior instruction for the PV suppression, and this plot indicates a value that is large during the daytime and peaks at noon when solar insolation is high. In contrast, the dashed-line plot Lp within FIG. 2 indicates the transitioning of the instruction value of the output limit of the power generator 6 as designated on the basis of the suppression instruction.

In the example of FIG. 2, in time slots from 09:00 to 11:00 and from 13:00 to 15:00 (times in the present disclosure indicated in 24-hour format), suppression of the power output from the power generator 6 to 40% of the rated power (for example, 2.0 kW relative to a rated power of 5.0 kW) is designated. Further, in the time slot from 11:00 to 13:00, suppression of the power output from the power generator 6 to 0% of the rated power of the power generator 6 is designated, that is to say, the designation is to output none of the power generated by the power generator 6. That is to say, in the time slot from 09:00 to 15:00 when the instruction value is less than 100%, the power output from the power generator 6 is suppressed. In contrast, in the time slots from 00:00 to 09:00 and from 15:00 to 24:00 when the instruction value is 100%, there is effectively no suppression of the power output from the power generator 6.

The suppression instruction designates the schedule of the PV suppression in 30 minute increment units, for example, and designates the instruction value for the output of the power generator 6 in increments of 1%, for example. Further, the suppression instruction may designate power units, such as kW units, rather than the fraction relative to the rated power of the power generator 6. For example, in the case in which the instruction value of 40% corresponds to the 2.0 kW output power and the limit value of 0% corresponds to 0 kW output power as illustrated in FIG. 2, the instruction values of the output power from the power generator 6 may be designated as 2.0 kW and 0 kW.

Hereinafter, the value indicating the instruction value by the units of power is referred to as the "limit value". In the case in which the instruction value designates the fraction, the limit value corresponds to the value obtained by multiplying the instruction value times the rated power of the power generator 6, and corresponds to the instruction value itself in the case in which the instruction value designates power. Further, the limit value can be indicated in Wh increments of the power amount by multiplying the limit value by time. For example, the value indicated in power amount units by multiplying the limit value by a 30 minute period, which is the increment of the schedule of the PV suppression, is termed the "limit amount", "suppression amount", or the like.

The control device 2 acquires the suppression instruction distributed by the power server 14, and forwards the acquired suppression instruction to the PV-PCS 11 of the power generator 6. Upon acquiring the suppression instruction forwarded from the control device 2, in the execution period of the PV suppression designated via the suppression instruction, the PV-PCS 11 adjusts the output power such that the fraction of the output power from the power generator 6 relative to the rated value of the power generator 6 does not exceed the instructed limit value. The PV-PCS executes phase-advance phase control as the method for the adjustment of the output power. Specifically, in the execution period of the PV suppression, the PV-PCS 11 causes a reduction in effective power output from the PV-PCS 11 by offsetting the phase of voltage from the phase of current.

Figure 3:
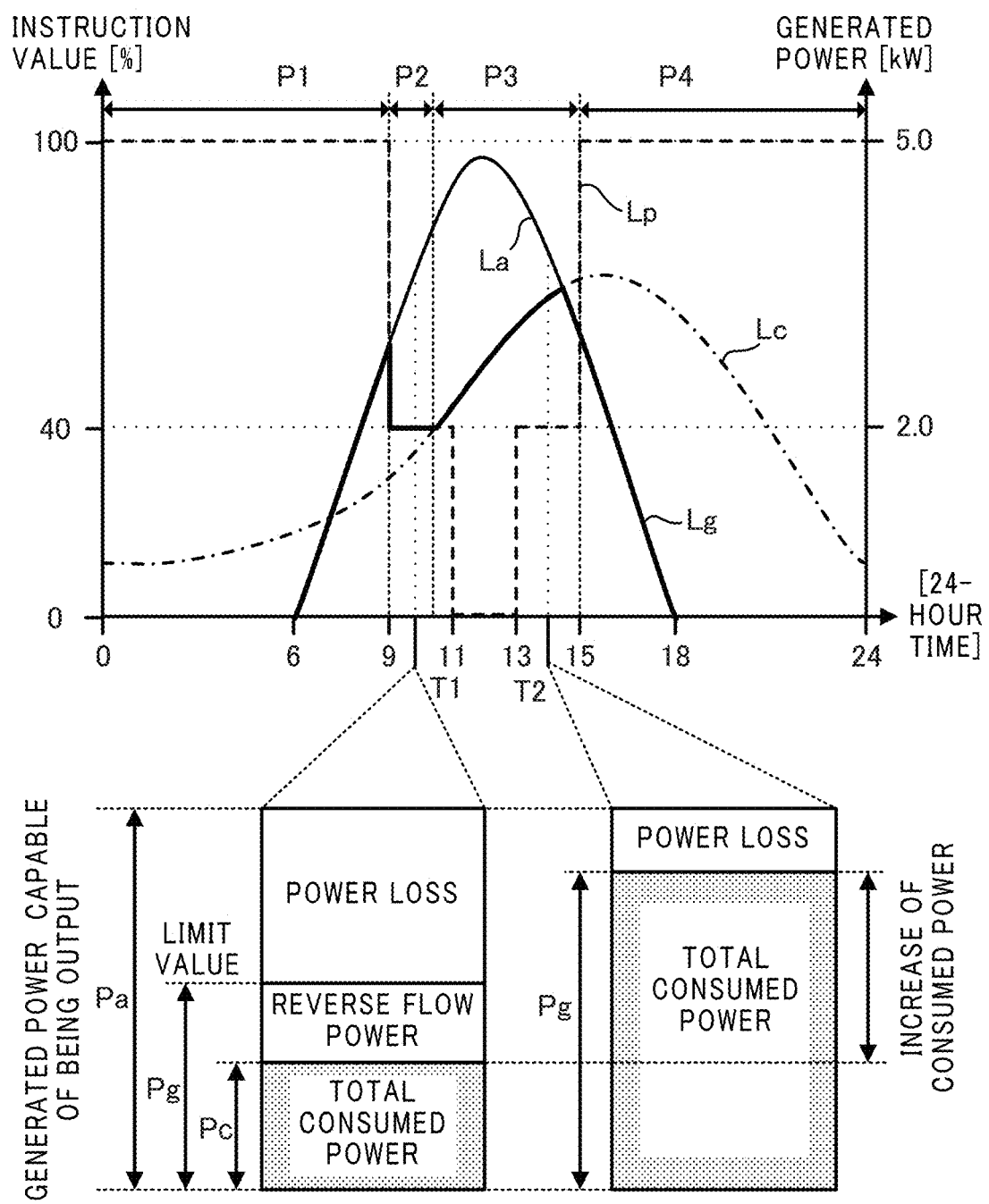
FIG. 3 is a chart illustrating trends in output power from a power generator during suppression of photovoltaic power.

FIG. 3 illustrates transitioning of the output power from the power generator 6 during the suppressing of the PV power. The dot-dashed-line plot Lc indicates transitioning of the total consumed power of the home H and indicates high values from the afternoon to evening during which a consumed power amount in a household generally increases. In contrast, the bold solid-line plot Lg in FIG. 3 indicates the output power from the power generator 6 within the power generated by the power generator 6, that is to say, indicates transitioning of the power Pg measured by the CT2.

In periods P1 and P4 when the PV suppression is not executed in the example illustrated in FIG. 3, the PV-PCS 11 does not suppress the output from the power generator 6. Thus the output power Pg from the power generator 6 indicated by the bold solid-line plot Lg becomes equivalent to the generated power capable of being output by the power generator 6 as indicated by the thin solid-line plot La. This generated power capable of being output by the power generator 6 is the power obtained by multiplying the conversion efficiency of the PV-PCS 11 by the power generated by the PV panel 10 (panel generated power). The generated power capable of being output by the power generator 6 is indicated hereinafter as Pa, and this is distinguished from the power Pg actually output from the power generator 6. The generated power Pa capable of being output by the power generator 6 is also referred to as the "generated power Pa from the power generator 6", the "generated power Pa", or the like.

In contrast, in periods P2 and P3 when the PV suppression is executed, the PV-PCS 11 suppresses the output from the power generator 6. Thus the output power Pg from the power generator 6 indicated by the bold solid-line plot Lg becomes smaller than the generated power Pa from the power generator 6 indicated by the thin solid-line plot La.

More specifically, among the periods P2 and P3 when the PV suppression is executed, the total consumed power Pc of the home H indicated by the dot-dashed-line plot Lc in the period P2 is smaller than the power (2.0 kW) corresponding to the limit value indicated by the dashed-line plot Lp. In this case, the PV-PCS 11 suppresses the output power Pg from the power generator 6, as indicated by the bold solid-line plot Lg, down to power corresponding to the limit value.

In contrast, among the periods P2 and P3 when the PV suppression is executed, the total consumed power Pc of the home H indicated by the dot-dashed-line plot Lc in the period P3 is larger than the power (2.0 kW) corresponding to the limit value indicated by the dashed-line plot Lp. In this case, the PV-PCS 11 suppresses the output power Pg from the power generator 6 as indicated by the bold solid-line plot Lg power merely equivalent to the total consumed power Pc, rather than down to the power corresponding to the limit value. However, in the period in which the generated power Pa capable of output from the power generation device 30 is less than the total consumed power Pc, such as the period immediately prior to 15:00 in FIG. 3, for example, the PV-PCS 11 makes the output power Pg from the power generator 6 equal to the generated power Pa capable of being output by the generated power.

The lower portion of FIG. 3 illustrates a relationship, at a time T1 included in the period P2 and at a time T2 included in the period P3, between lost power and the generated power Pa capable of output from the power generator 6. Here, the expression "lost power" indicates the power generation loss and is the power (Pa minus Pg) that is not output from the PV-PCS 11 despite generation of electricity by the PV panel 10 of the power generator 6. At the time T1 included in the period P2, the output power Pg from the power generator 6 is suppressed to the power corresponding to the limit value, and thus the lost power of the power generator 6 is relatively large. In contrast, at the time T2 included in the period P3, the suppression is only down to the power equivalent to the total consumed power Pc, and thus the lost power of the power generator 6 is relatively small. Thus the lost power can be decreased during PV suppression if the total consumed power Pc is increased so as to exceed the limit value.

Further, at the time T1 included in the period P2, the output power Pg from the power generator 6 suppressed down to the power corresponding to the limit value is larger than the total consumed power Pc of the home H, and thus power corresponding to the difference (Pg minus Pc) is in excess as excess power. This excess power is sold to the commercial electrical power system 8 as the reverse flow power. In contrast, at the time T2 included in the period P3, the output power Pg from the power generator 6 is equivalent to the total consumed power Pc of the home H, and thus power is neither sold nor purchased.

Figure 4:
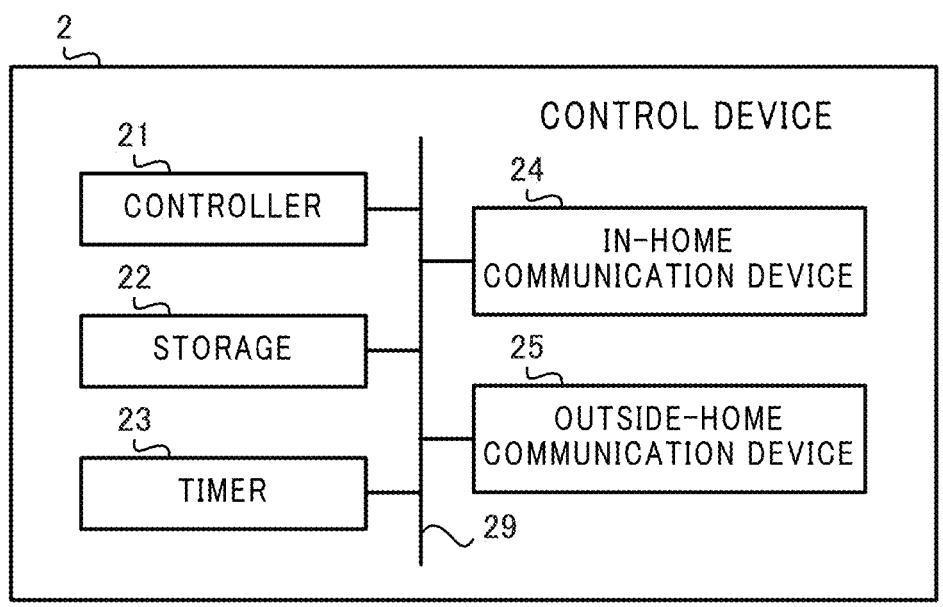
FIG. 4 is a block diagram illustrating a hardware configuration of a control device.

The control device 2 is described next. As illustrated in FIG. 4, the control device 2 includes a controller 21, a storage 22, a timer 23, an in-home communication device 24 and an outside-home communication device 25. Each of these components is connected via a bus 29.

The controller 21 includes (all non-illustrated) components such as a CPU, a ROM, and a RAM. The "CPU" is also termed a central processor, central calculator, processor, microprocessor, microcomputer, digital signal processor (DSP), or the like. The controller 21 performs overall control of the control device 2 by the CPU reading a program and data stored in the ROM, and using the RAM as a working area.

The storage 22 is nonvolatile semiconductor memory such as a flash memory, an erasable programmable ROM (EPROM), an electrically erasable programmable ROM (EEPROM), or the like, and acts as a so-called secondary storage device (auxiliary storage device). The storage 22 storage stores various types of programs and data used by the controller 21 for various types of processing, as well as various types of data generated or acquired by the controller 21 performing the various types of processing.

The timer 23 includes a real time clock (RTC) and is a time-measuring device that continues to measure time even during periods when power is turned off to the control device 2.

The in-home communication device 24 includes a network interface card (NIC) controller for communication via a wireless network installed in the home H, and under control of the controller 21, communicates via the wireless network with each of the power measurement device 4, the water heater 5, the power generator 6, and the apparatus 7. Further, under the control of the controller 21, the in-home communication device 24 communicates with the operating terminal 3 via Wi-Fi (registered trademark), Wi-SUN (registered trademark), wireless LAN, or the like.

The outside-home communication device 25, via the router 12, is connected to the wide area network N such as the Internet, for example. The outside-home communication device 25 communicates with the data server 13, the power server 14, and the like via the wide area network N.

Figure 5:
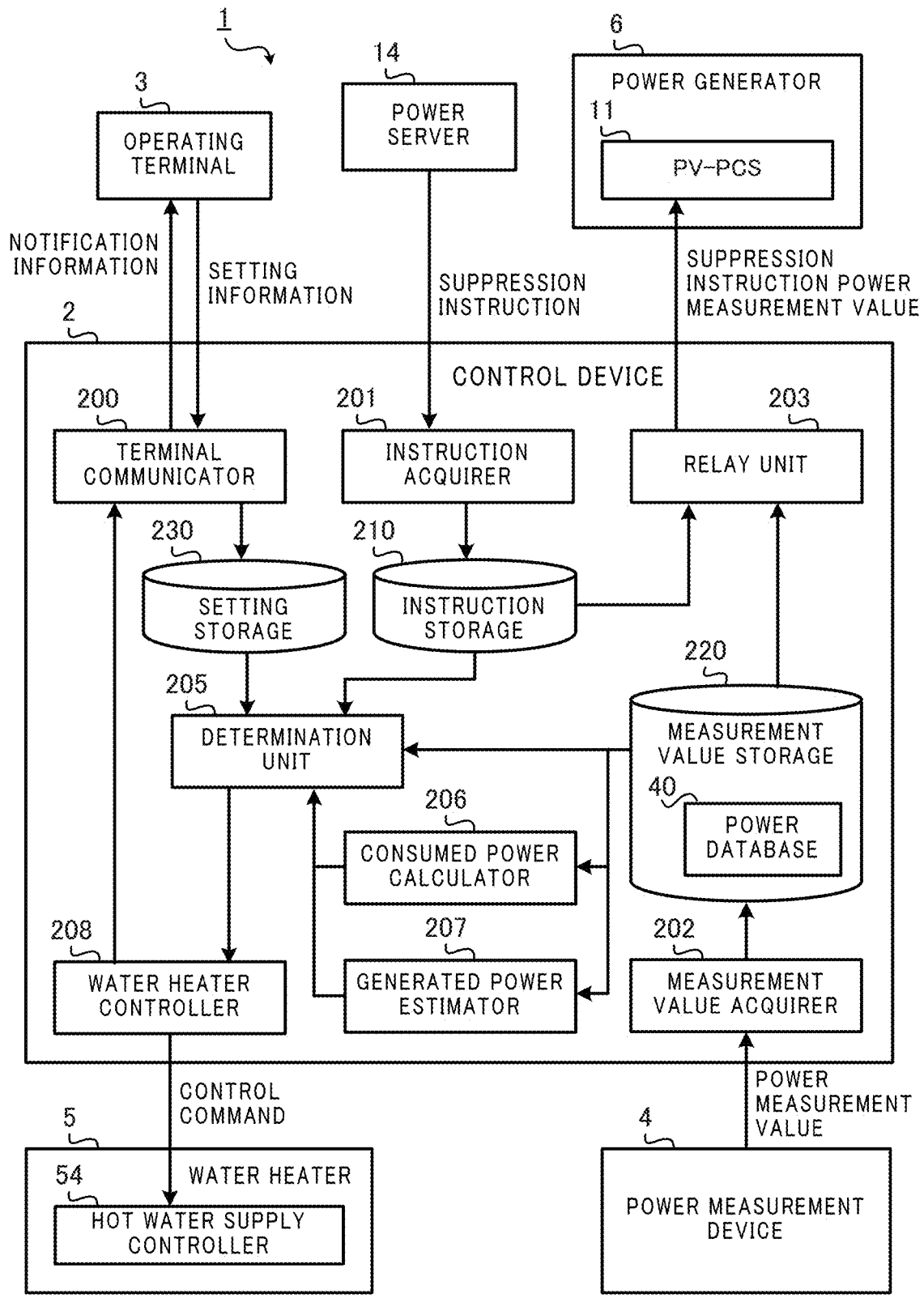
FIG. 5 is a block diagram illustrating a functional configuration of the control device.

Functional configuration of the control device 2 is described next with reference to FIG. 5. As illustrated in FIG. 5, the control device 2 functionally includes a terminal communicator 200, an instruction acquirer 201, a measurement value acquirer 202, a relay unit 203, a determination unit 205, a consumed power calculator 206, a generated power estimator 207, and a water heater controller 208. Each of these functions is achieved by software, firmware, or a combination of software and firmware. The software and firmware are recorded as programs and are stored in the storage 22 or in the ROM within the various apparatuses. Further, the controller 21 achieves the function of each of the components by the CPU executing the programs stored in the ROM or the storage 22.

Further, the control device 2 includes an instruction storage 210, a measurement value storage 220, and a setting storage 230. The instruction storage 210, the measurement value storage 220, and the setting storage 230 are constructed in memory regions within the storage 22.

The terminal communicator 200 communicates with the operation terminal 3 via the in-home communication device 24. FIG. 6 illustrates a specific example of a setting screen displayed by the operating terminal 3. The terminal communicator 200 functions as a display controller to cause a display device of the operating terminal 3 to display the setting screen illustrated in FIG. 6. In the setting screen illustrated in FIG. 6, the user, who is the power consumer, can set various types of modes via an input device of the operating terminal 3.

For example, "solar output suppression-coordinated mode" is a mode that effectively uses the lost power of the power generator 6 during suppression of PV power by coordinated control of the water heater 5 during PV suppression. The user can make activate this function by setting ON the item "solar output suppression-coordinated control" that occurs in the "solar output suppression-coordinated mode". Upon setting ON of the item "solar output suppression coordinated control", the operating terminal 3 transmits setting information indicating the contents of such setting to the control device 2. The terminal communicator 200 of the control device 2 functions as a setting information receiver that receives setting information transmitted from the operating terminal 3. The controller 21 operates cooperatively with the in-home communication device 24 to achieve the terminal communicator 200 function. The setting information received by the terminal communicator 200 is stored in the setting storage 230.

The instruction acquirer 201 acquires an instruction to, in the specified period, suppress the supplying, to the commercial electrical power system 8, of power from the power generator 6 that supplies power to the specified power-consuming area. The expression "specified power-consuming area" is specifically the home H and the grounds thereof, and is the site that receives the supply of power, and consumes the received power, from the commercial electrical power system 8 and from the power generator 6 installed at the home H. The expression "an instruction to suppress the supplying in the specified period" means the instruction (suppression instruction) for PV suppression distributed from the power server 14 as described previously.

Upon the power server 14 distributing the suppression instruction, the instruction acquirer 201 acquires the distributed suppression instruction via the wide area network N. Upon the instruction acquirer 201 acquiring the suppression instruction, the content of the PV suppression, such as the limit value and the schedule designated by the acquired suppression instruction, are stored in the instruction storage 210. The controller 21 operates cooperatively with the outside-home communication device 25 to achieve the instruction acquirer 201 function.

The instruction storage 210 stores the content of the suppression instruction acquired by the instruction acquirer 201. The expression "content of the suppression instruction" means specifically the limit value and the schedule of the PV suppression designated by the suppression instruction. The instruction storage 210 updates the limit value and the schedule of the stored PV suppression each time the information acquirer 201 acquires the suppression instruction from the power server 14.

The measurement value acquirer 202 acquires, via the in-home communication device 24, the measurement value of the power obtained by the power measurement device 4 from the power measurement device 4. Specifically, the measurement value acquirer 202 acquires: a measurement value of the power Pg supplied to the home H from the power generator 6, a measurement value of the power Pb supplied to the home H from the commercial electrical power system 8, and a measurement value of the power Pe supplied to the water heater 5.

The power measurement device 4 sends periodically, for example, the measurement values of the power Pb, Pg, and Pe transmitted through the power lines D1 to D3 and obtained by the CT1 to CT3 to the control device 2. Alternatively, the measurement value acquirer 202 may, as required, transmit to the power measurement device 4 a request for the measurement values of the power Pb, Pg, and Pe, and the power measurement device 4 may transmit to the control device 2 the measurement values of the power Pb, Pg, and Pe in the format of a reply to this request. In this manner, the controller 21 operates cooperatively with the in-home communication device 24 to achieve the measurement value acquirer 202 function.

The measurement value storage 220 stores the measurement values of the power Pb, Pg, and Pe acquired by the measurement value acquirer 202. Every time the measurement value acquirer 202 acquires the measurement values of the power Pb, Pg, and Pe obtained by the power measurement device 4, the measurement value storage 220 stores the acquired measurement values and builds a database.

FIG. 7 illustrates a specific example of a power database 40 stored in the measurement value storage 220. As illustrated in FIG. 7, the power database 40 stores, as a time series in chronological order, the power amount of the purchased power Pb, the power amount of the output power Pg of the generated power, the power amount of the total consumed power Pc of the home H obtained by adding together the power Pb and the power Pg, and the power amount of the consumed power Pe of the water heater.

Upon acquiring the measurement values of the power Pb, Pg, and Pe from the power measurement device 4, the measurement value acquirer 202 calculates the respective power amounts and stores the calculated power amounts consecutively in the power database 40. Here, the term "power amount" means a value of power integrated over a predetermined period. Specifically, the measurement value acquirer 202 integrates over 30 minutes, which is the incremental unit of the schedule of the PV suppression, the measurement values of the power Pb, Pg, and Pe from the power measurement device 4 and the sum of the power Pb and the power Pg. In this manner, the measurement value acquirer 202 acquires the power amounts in 30 minute increment units for each of the measurement value of the purchased power Pb, the measurement value of the output power Pg of the generated power, the measurement value of the consumed power (total consumed power) Pc of the home H obtained as the sum of the power Pb and the power Pg, and the measurement value of the consumed power Pe of the water heater, and the measurement value acquirer 202 stores these acquired power amounts in the power database 40 every 30 minutes.

Further, in the case in which the measurement value of the power Pg supplied to the home H from the power generator 6 is acquired as the power amount, the measurement value acquirer 202 functions as a first measurement value acquirer. In the case in which the measurement value of the consumed power Pc (equal to Pb plus Pg) of the home H is acquired as the power amount, the measurement value acquirer 202 functions as a second measurement value acquirer. In the case in which the measurement value of the consumed power Pe of the water heater 5 is acquired as the power amount, the measurement value acquirer 202 functions as a third measurement value acquirer. Hereinafter, the processing of the determination unit 205, the consumed power calculator 206, and the generated power estimator 207 is executed using the measurement values of the power Pb, Pg, Pe, and Pc stored as the power amounts in the power database 40.

The relay unit 203 relays to the PV-PCS11 of the power generator 6 via the in-home communication device 24 the content of the suppression instruction acquired by the instruction acquirer 201. Further, the relay unit 203 relays the measurement value of the power Pb, Pg, and Pe acquired by the measurement value acquirer 202 to the PV-PCS 11 of the power generator 6 via the in-home communication device 24. In this manner, the controller 21 achieves the relay unit 203 function cooperatively with the in-home communication device 24.

In the case in which the suppression instruction is acquired by the instruction acquirer 201, the determination unit 205 determines whether a predetermined condition is satisfied to command the water heater 5 to perform the water heat-up operation in the specified period designated by the suppression instruction. The "predetermined condition to command the water heater 5 to perform the water heat-up operation" is a condition for determining whether the water heat-up operation of the water heater 5 can efficiently use the lost power that occurs during the period of suppression, by the PV suppression, of power output from the power generator 6. Since the water heat-up operation of the water heater 5 generally has high consumed power in comparison to the use of the other apparatuses, the water heat-up operation of the water heater 5 is used due to the ability to efficiently use the lost power. The controller 21 achieves the determination unit 205 function. The determination processing of the determination unit 205 is described in detail hereinafter with reference to FIG. 8.

Figure 8:
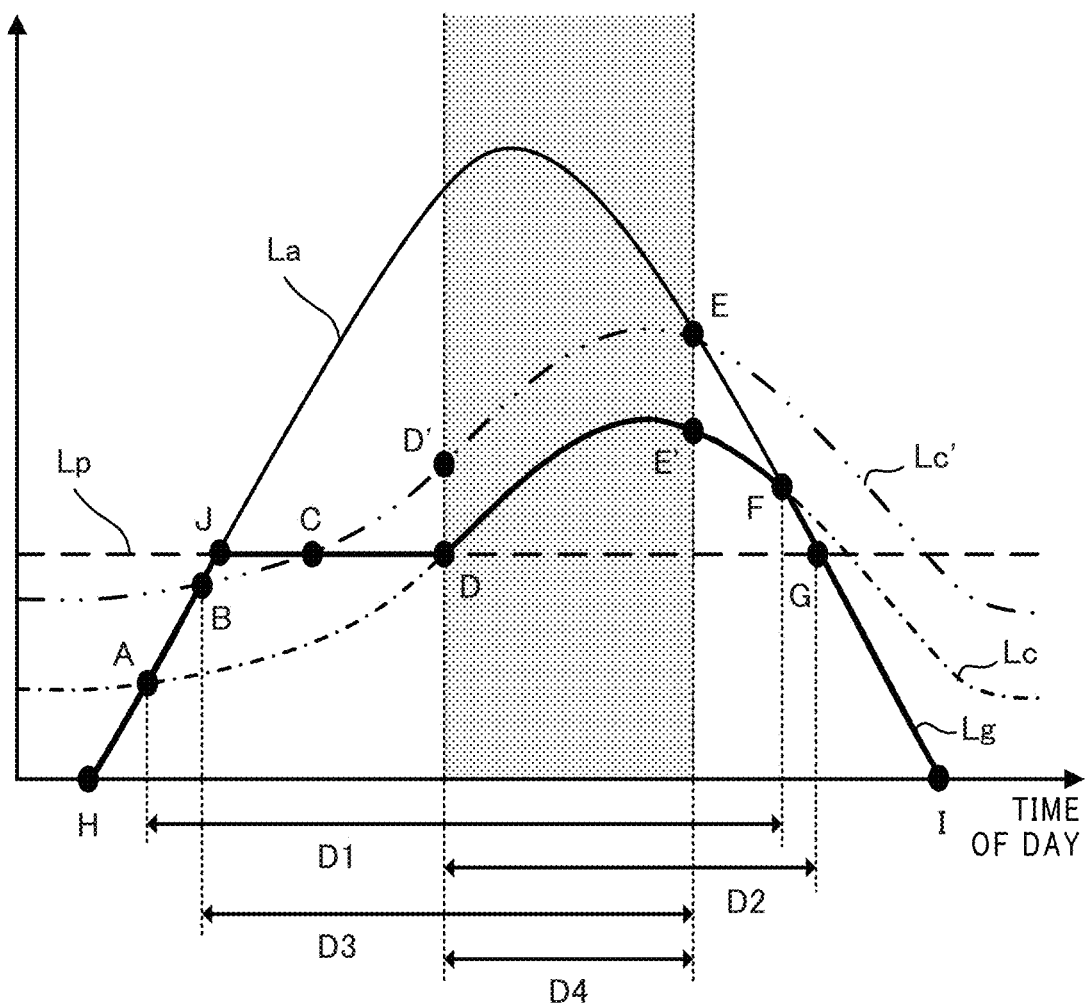
FIG. 8 is a chart illustrating a relationship between generated power and consumed power during suppression of PV power, and illustrating timing of a water heat-up operation to be performed by a water heater.

FIG. 8 illustrates a specific example of: a relationship between the consumed power Pc and the generated power Pa during the suppression of PV power, and timing of the water heat-up operation to be performed by the water heater 5. Similarly to the example illustrated in FIG. 2 and FIG. 3, the solid-line plot La in FIG. 8 indicates transitioning of the generated power Pa from the power generator 6 occurring when there is no prior instruction for PV suppression, and the dashed-line plot Lp indicates transitioning of the limit value of the output power Pg from the power generator 6 designated by the suppression instruction. Further, the dot-dashed-line plot Lc indicates the transitioning of the total consumed power Pc of the home H, and the bold solid-line plot Lg indicates the transitioning of the output power Pg from the power generator 6. However, for ease in understanding of the example illustrated in FIG. 8, the limit value of the output power Pg indicated by the dashed-line plot Lp is described for a case in which the limit value is constant in all regions.

As illustrated in FIG. 8, in the period from a time A to a time F during the period from a time H to a time I when power is generated by the power generator 6 (in other words, the generated power Pa is positive), the generated power Pa is larger than the consumed power Pc of the home H. Thus in the period from the time A to the time F, power is not purchased from the commercial electrical power system 8. Further, in the period from the time A to a time D, the consumed power Pc of the home H is less than the limit value. Thus in the period from the time A to the time D, the output power Pg from the power generator 6 is suppressed to the limit value, and power is sold from the home H to the commercial electrical power system 8. In contrast, in the period from the time D to the time F, the consumed power Pc of the home H is larger than the limit value. Thus in the period from the time D to the time F, the output power Pg from the power generator 6 is suppressed to the total consumed power Pc within the home H, and power is neither sold nor purchased.

The determination unit 205 determines, as first determination processing, whether a first condition is satisfied. This first condition is satisfied in the case in which power is not being supplied to the home H from the commercial electrical power system 8, that is to say, in the case in which power is not being purchased from the commercial electrical power system 8. The determination unit 205, on the basis of the measurement value of the power Pb acquired by the measurement value acquirer 202, determines whether power is being purchased from the commercial electrical power system 8. In the case in which power is being purchased, there is neither excess power nor generation loss, and thus causing operation of the water heater 5 is not required.

Specifically, the determination unit 205 determines whether the power amount of the power Pb stored last in the power database 40 is greater than or equal to a predetermined threshold $\alpha$. The threshold $\alpha$ is a margin that takes into account a possibility that the sold power amount can, depending on conditions, increase instantaneously during the sale of power, and this threshold $\alpha$ is a small positive value, such as 50 Wh. A period D1, from the time A to the time F indicated in FIG. 8, is identified by the first determination processing.

The determination unit 205 determines, as second determination processing, whether a second condition is satisfied. This second condition is satisfied in the case in which the power Pg supplied from the power generator 6 to the home H is larger than a limit value determined in accordance with the suppression instruction. The determination unit 205 determines whether the measurement value of the power Pb acquired by the measurement value acquirer 202 is larger than the limit value determined in accordance with the suppression instruction.

Two cases are considered in which this second condition is not satisfied. In one case, weather occurring in the execution period of PV suppression is poor such that the power generation amount of the power generator 6 does not reach the suppression amount, that is, the power Pg is less than the limit value. In this case, a state occurs in which the power generator 6 is not suppressing output, and thus there is no occurrence of the power generation loss. In the other case, the output power Pg from the power generator 6 is suppressed to the limit value, that is, the power Pg=the limit value, for example, as in the period from the time A to the time D indicated in the FIG. 8. In this case, the excess power is sold to the commercial electrical power system 8. Thus diversion of this portion of power to the water heater 5 until the stoppage of the sale of power is not economically efficient from the standpoint of the power consumer. Power is not being sold in period D2 the period in which the second condition is satisfied and the output power PG from the power generator 6 is greater than the limit value, and thus the sale of power is not prevented even if the water heater 5 is operated.

That is to say, the determination unit 205 determines whether the power amount of the power Pg stored last in the power database 40 is greater than or equal to a value obtained by adding a threshold $\beta$ to the suppression amount, that is, determines whether the present output power amount of the power generator 6 substantially exceeds the suppression amount. The threshold $\beta$ is a margin that takes into account existence of somewhat of a mismatch in the adjustment of output of the PV-PCS 11 in real time, and thus this threshold is a small positive value, such as 100 Wh. The period D2 is identified by the second determination processing to be from the time D to a time G indicated in FIG. 8.

The determination unit 205 determines, as third determination processing, whether a third condition is satisfied. This third condition is satisfied in the case in which the consumed power of the home H when the water heater 5 performs the water heat-up operation is smaller than the generated power Pa generated by the power generator 6. For example, in the case in which the consumed power of the home H when the water heater 5 performs the water heat-up operation is larger than the generated power Pa capable of being output by the power generator 6, the purchase of power is required for the water heater 5 to perform the water heat-up operation. The allowing of the water heater 5 to perform the water heat-up operation until power is purchased cannot be efficient from the standpoints of the environment and the economics of the power consumer. Thus the determination unit 205 determines, as the third determination processing, whether the consumed power of the home H occurring when the water heater 5 performs the water heat-up operation is smaller than the generating power Pa generated by the power generator 6, that is to say, determines whether the water heater 5 can perform the water heat-up operation even without the purchase of power.

In order to execute the third determination processing, the consumed power calculator 206 calculates, on the basis of the measurement values of the power Pc and the power Pe stored in the power database 40, the consumed power of the home H occurring when the water heater 5 performs the water heat-up operation. Further, the generated power estimator 207 estimates the generated power Pa generated by the power generator 6 on the basis of the measurement value of the power Pg stored in the power database 40. The consumed power calculator 206 and the generated power estimator 207 are each achieved by the controller 21 operating in cooperation with the storage 22.

Specifically, the consumed power calculator 206 calculates the consumed power of the home H occurring when the water heater 5 performs the water heat-up operation (referred to hereinafter as Pc') by firstly subtracting, from the measurement value of the consumed power Pc of the home H prior to the water heater 5 executing the water heat-up operation, the measurement value of the consumed power Pe of the water heater 5 occurring prior to the water heater 5 executing the water heat-up operation, further adding a rated value R of the consumed power of the water heater 5. That is to say, the following relationship formula is established: Pc'=Pc−Pe+R.

The measurement value of the consumed power Pc and the measurement value of the consumed power Pe of the water heater 5 of the home H occurring prior to the water heater 5 executing the water heat-up operation are acquired by the measurement value acquirer 202 functioning as the second measurement value acquirer and the third measurement value acquirer, respectively, and these measurement values are stored as power amounts in the power database 40. The consumed power calculator 206 refers to the measurement values of the power Pc and the power Pe stored last in the power database 40. Further, the consumed power Pe of the water heater 5 is a value near zero if the water heater 5 is not operating, and this value corresponds to execution of some operation by the water heater 5 if such execution is in progress.

The rated value R of the consumed power of the water heater 5 is the maximum power amount expected to be consumed by the water heater 5 when the water heater 5 performs the water heat-up operation. The rated value R is specified beforehand in accordance with various types of conditions such as a heat-up temperature, a hot water storage amount, and the like, and this value is stored beforehand in storage means of the water heater 5 or in the storage 22 of the control device 2. If the rated value R is stored in the water heater 5, the consumed power calculator 206 acquires the rated value R corresponding to the water heat-up operation to be performed, as may be required, from the water heater 5 via the in-home communication device 24.

The consumed power calculator 206 subtracts the measurement value of the consumed power Pe of the water heater 5 from the measurement value of the total consumed power Pc of the home H acquired in the aforementioned manner, and further adds the rated value R of the water heater 5, to calculate the consumed power Pc' of the home H forecast for when the water heater 5 performs the water heat-up operation. This consumed power Pc', as indicated by the double-dot-dashed line Lc' in FIG. 8, illustrates transitioning that is the transitioning of the total consumed power Pc with a fixed offset added thereto.

Secondly, the generating power Pa generated by the power generator 6 can be acquired by using the CT2 arranged in the power line D2 to measure the output power Pg from the power generator 6 during the period when PV suppression is not being executed. However, measurement of the panel generated power cannot be performed during the period of execution of the PV suppression, and thus the generated power Pa cannot be acquired directly. Thus the generated power estimator 207 uses a past power generation amount result as the estimated value of the present generated power Pa. Specifically, the generated power estimator 207 estimates, as the generated power Pa from the power generator 6 occurring in the execution period of the PV suppression, the output power Pg from the power generator 6 occurring during the period (period prior to the specified period of execution of the PV suppression) when the PV suppression is not executed.

The measurement value of the output power Pg from the power generator 6 occurring in the period prior to the specified period for execution of the PV suppression is acquired by the measurement value acquirer 202 functioning as the first measurement value acquirer and is stored as a power amount in the power database 40. The generated power estimator 207 estimates the generated power Pa using, among the measurement values of the power Pg stored in the power database 40, the measurement value of the output power Pg supplied to the home H from the power generator 6 in the same time slot as a designated time slot for execution of the PV suppression and that occurs in several days (past C days) prior to a specified day for execution of the PV suppression.

Here, the expression "same time slot" means a time slot that starts at the same time of day as the start time of the PV suppression and ends at a time of day that is the same as the end time of the PV suppression. If the time slots during the day are the same, solar insolation is roughly the same, and thus the power generation amount from solar power generation is estimated to be about the same, so the measurement values occurring at the same time slot as the specified time slot for execution of the PV suppression are used.

FIG. 9 illustrates an example of transitioning of the measurement values of the output power from the power generator during a three day period prior to the day in which the PV suppression is executed. In the example of FIG. 9, on the day one day prior to the day of execution of the PV suppression, the output power amount from the power generator 6 is low in the morning and becomes high in the evening. In contrast, on the day two days prior to the day of execution of the PV suppression, the power generation amount from sunlight is low all day long. Further, on the day three days prior to the day of execution of the PV suppression, the output power amount from the power generator is high in the morning and becomes low in the afternoon. In this manner, the output power amount from the power generator 6 is affected by weather during the day.

For each time included in the specified time slot for execution of the PV suppression, the generated power estimator 207 estimates, as the generated power Pa occurring at the time of day when PV suppression is executed, the maximum value of measurement values acquired in the previous C days by the measurement value acquirer 202. For example, in each of the previous C days, if the measurement value of the output power Pg occurring at the X-th day among the previous C days is maximum among the measurement values of the output power Pg measured in a first period included in the same time slot as the specified time slot of execution of the PV suppression, the generated power estimator 207 estimates that the measurement value of the output power Pg occurring on the X-th day is the generated power Pa occurring in the first period of the day of execution of the PV suppression. Further, in each of the previous C days, if the measurement value of the output power Pg occurring at the Y-th day among the previous C days is maximum among the measurement values of the output power Pg measured in a second period included in the same time slot as the specified time slot of execution of the PV suppression, the generated power estimator 207 estimates that the measurement value of the output power Pg occurring on the Y-th day is the generated power Pa occurring in the second period of the day of execution of the PV suppression.

FIG. 10 illustrates the transitioning of the maximum values (movement of maximum values) among the measurement values of the output power from the power generator occurring during the three day period prior to the day of execution of the suppression of PV power as illustrated in FIG. 9. The generated power estimator 207, on the basis of the measurement results of the output power Pg of the previous three days illustrated in FIG. 9, estimates that the value of the transitioning illustrated in FIG. 10 is the generated power Pa occurring in each of the periods of the day in which the PV suppression is executed. The maximum values of the measurement values of the output power Pg in each period are used, for estimation of an upper limits of power generation from sunlight due to the days when the PV suppression is executed, because such days are normally days of clear weather when the reverse flow power is anticipated to be high, and thus power from sunlight is anticipated to be generated at the maximum limit. The number of past C days is set so as to include at least a day of clear weather when the PV suppression is not executed, for example, such as being set to a consecutive ten days to two weeks immediately prior to the day of execution of the PV suppression.

The determination unit 205 uses the consumed power Pc' calculated by the consumed power calculator 206 and the generated power Pa estimated by the generated power estimator 207 to execute the third determination processing for the specified period when there is the instruction for the PV suppression. That is to say, the determination unit 205 determines whether the consumed power Pc' of the home H when the water heater 5 performs the water heat-up operation is smaller than the generated power Pa generated by the power generator 6. The period D3 from a time B to a time E (E') illustrated in FIG. 8 is determined by the third determining processing.

If there is prior acquisition of the suppression instruction by the instruction acquirer 201, in the specified period of the instruction for the PV suppression, when the determination unit 205 determines that the predetermined conditions are satisfied, the water heater controller 208 commands the water heater 5 to heat water.

The predetermined conditions are the three conditions occurring in the aforementioned first through third determination processing by the determination unit 205, and when these three conditions are all satisfied, the predetermined conditions are satisfied. Specifically, the predetermined conditions are satisfied when: (1) power is supplied to the home H from the commercial electrical power system 8, (2) the power Pg supplied to the home H from the power generator 6 is higher than the limit value determined in accordance with the suppression instruction, and (3) the consumed power of the home H occurring when the water heater 5 performs the water heat-up operation is lower than the generated power Pa generated by the power generator 6. The time slot when all of these three conditions is satisfied is a period D4 from the time D (D') to the time E (E') in the example illustrated in FIG. 8.

In this manner, the water heater controller 208 commands the water heater 5 to heat water in at least a portion of the periods in which, within the specified period for which there is the instruction for PV, the predetermined conditions are satisfied. Specifically, the water heater controller 208 transmits to the hot water supply controller 54 of the water heater 5 via the in-home communication device 24 a PV suppression-permitting trigger indicating permission for the water heat-up operation. However, when the predetermined conditions are not satisfied within the specified period in which PV suppression is commanded, the water heater controller 208 commands the water heater 5 to end the water heat-up operation. Specifically, the water heater controller 208 transmits to the hot water supply controller 54 of the water heater 5 via the in-home communication device 24 a PV suppression-cancellation trigger indicating cancellation of the water heat-up operation. In this manner, the function of the water heater controller 208 is achieved by the controller 21 in cooperation with the in-home communication device 24.

In the execution period of the PV suppression, if the predetermined conditions are satisfied, the water heater controller 208 repeatedly in a predetermined cycle transmits to the hot water supply controller 54 this type of command. The predetermined cycle, for example, has units that are the same as those of the schedule for PV suppression, such as 30 minutes. By periodic transmission of the command at a fixed cycle, the command can be reliably transmitted to the water heater 5 even when momentary breakdowns occur in the transmission of the command.

Upon receiving the command for the water heat-up operation, the hot water supply controller 54 performs the water heat-up operation in accordance with the received command from the water heater controller 208. Specifically, the hot water supply controller 54 controls the heat pump unit 50 so as to generate hot water of the desired heat-up temperature within the hot water storage tank 53. Various types of conditions occurring in the water heat-up operation, such as the heat-up temperature and the hot water storage amount, for example, are specified by the user via the remote controller 55.

Further, the water heater controller 208 transmits the command without taking into account the condition of the water heater 5, and thus there are cases in which the hot water supply controller 54 does not operate in accordance with the received command. For example, the hot water supply controller 54, upon receiving an command to further perform the water heat-up operation when the water heater 5 is already executing the water heat-up operation, discards the command. In the same manner, the hot water supply controller 54, upon receiving an command to stop the water heat-up operation when the water heater 5 is already not executing the water heat-up operation, discards the command. The number of heat-up operations performed on a single day is set to one per day, for example, in consideration of working life of the compressor. Thus upon receiving the command once to perform the water heat-up operation and then executing the water heat-up operation, the hot water supply controller 54 does not perform the water heat-up operation for a second time even though a water heat-up operation is received at another time on the same day. Further, in the case of reception of a control command for the water heater 5 via the remote controller 55 from the user, the hot water supply controller 54 prioritizes the control command from the user.

Figure 11:
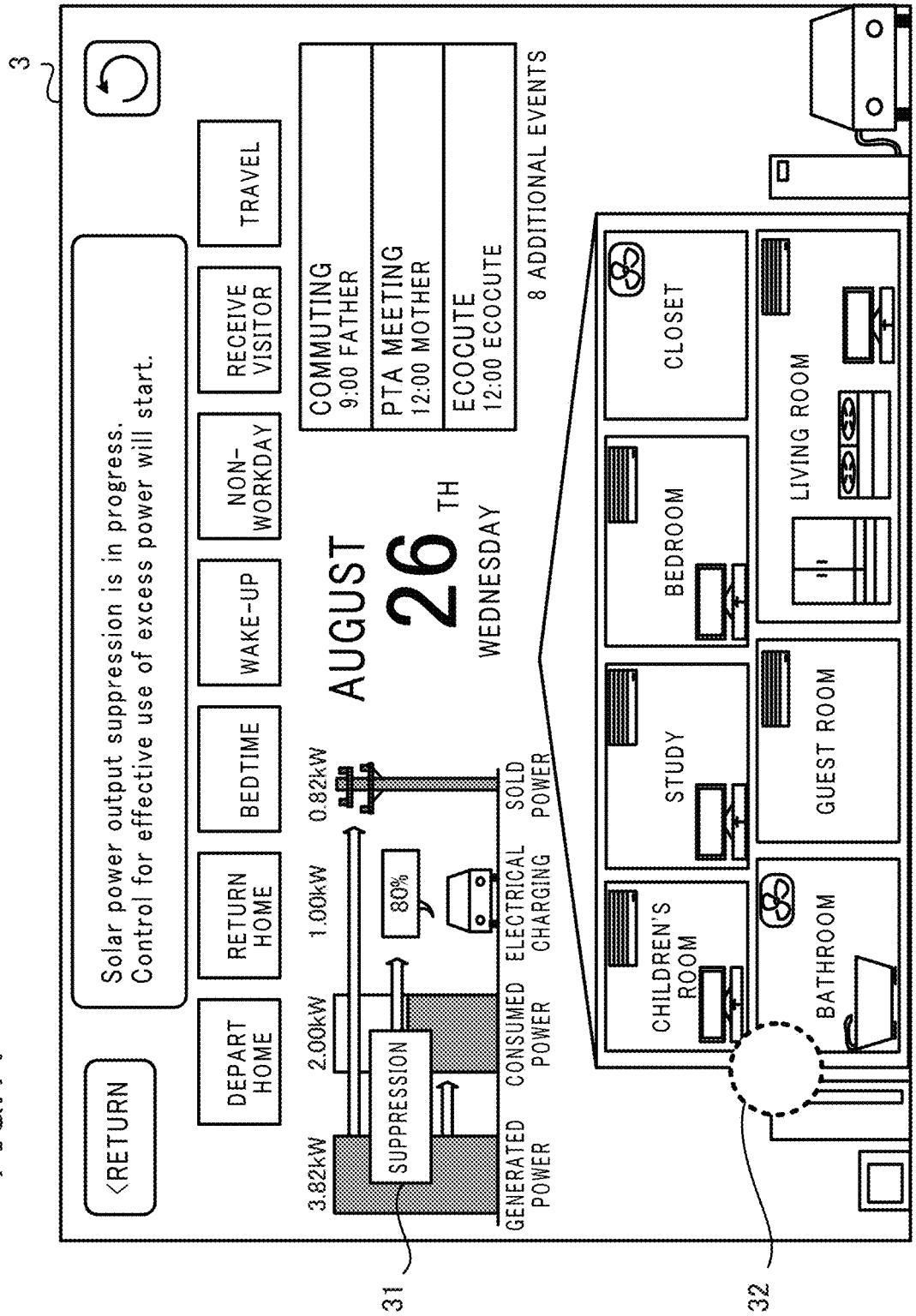
FIG. 11 is a diagram illustrating an example of a display screen displayed by the operating terminal during PV power suppression.

The result of the control of the water heater 5 by the water heater controller 208 is displayed via the operating terminal 3. FIG. 11 illustrates a specific example of a display screen displayed by the operating terminal during the PV suppression. In the period of execution of the PV suppression, as illustrated in FIG. 11, the terminal communicator 200 functions as a controller to cause the display device of the operating terminal 3 to display notification information including an apparatus listing, an apparatus layout, messages indicating the present status, and the like.

Specifically, the terminal communicator 200 displays a PV suppression graphic 31 indicating that PV suppression is in progress, and also displays amounts of the generated power, the consumed power, the charged power, and the sold power. Further, during the PV suppression, the terminal communicator 200 displays in the vicinity of a graphic of the water heater 5, which is the apparatus targeted for coordinated control, a coordinated control graphic 32 indicating that coordinated control is being executed. Due to such display, the user can visually confirm various types of information occurring during the PV suppression.

Processing executed by the energy management system 1 configured in the aforementioned manner is described with reference to FIG. 12 to FIG. 14.

Figure 12:
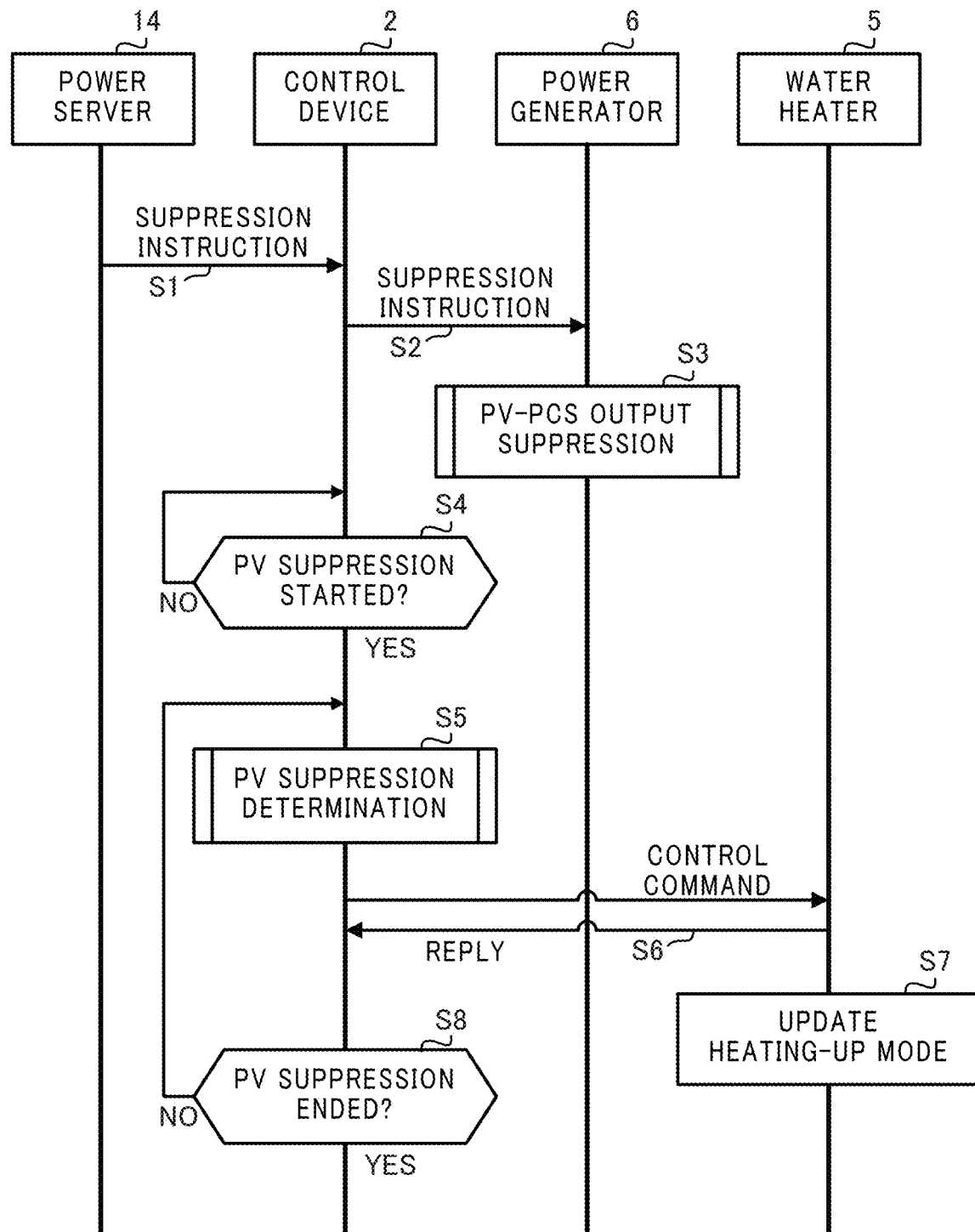
FIG. 12 is a sequence diagram illustrating a summary of processing executed by the energy management system.

A summary of the processing executed by the energy management system 1 is illustrated in FIG. 12. FIG. 12 illustrates the processing executed by the power server 14, the control device 2, the power generator 6 and the water heater 5, after a PV suppression instruction is transmitted once from the power server 14 until completion of execution of such PV suppression. In the case in which the instruction for the PV suppression is transmitted from the power server 14 multiple times, the processing illustrated in FIG. 12 is executed in parallel for each of the multiple PV suppressions.

Further, although the power measurement device 4 and the operating terminal 3 are not illustrated in FIG. 12, during the period of execution of the processing illustrated in FIG. 12, the power measurement device 4 by the CT1 through CT3 measures the power sent through the power lines D1 through D3, and sequentially transmits to the control device 2 the measurement values of the measured power. Further, the operating terminal 3 by the setting screen illustrated in FIG. 6 receives a setting from the user for solar output suppression coordinated control and transmits to the control device 2 content of the received setting.

Upon determination of the execution of the PV suppression and confirmation of the schedule and detailed contents thereof, the power server 14 distributes to each power consumer the instruction (suppression instruction) for the PV suppression (step S1). Upon distribution of the suppression instruction from the power server 14, the control device 2 acquires the distributed suppression instruction via the wide area network N. Upon acquiring of the suppression instruction, the control device 2 forwards the acquired suppression instruction to the PV-PCS 11 of the power generator 6 via the wireless network installed in the home H (step S2).

Upon acquiring the suppression instruction forwarded from the control device 2, the PV-PCS 11 executes, in accordance with the acquired suppression instruction, suppression of the output of the generated power generated by the power generator 6 (step S3). FIG. 13 illustrates details of the output suppression processing of the PV-PCS 11 executed in the step S3. This output suppression processing is executed repeatedly in a fixed cycle during the period in which power is supplied to the PV-PCS 11. The fixed cycle is one minute long, for example.

Figure 13:
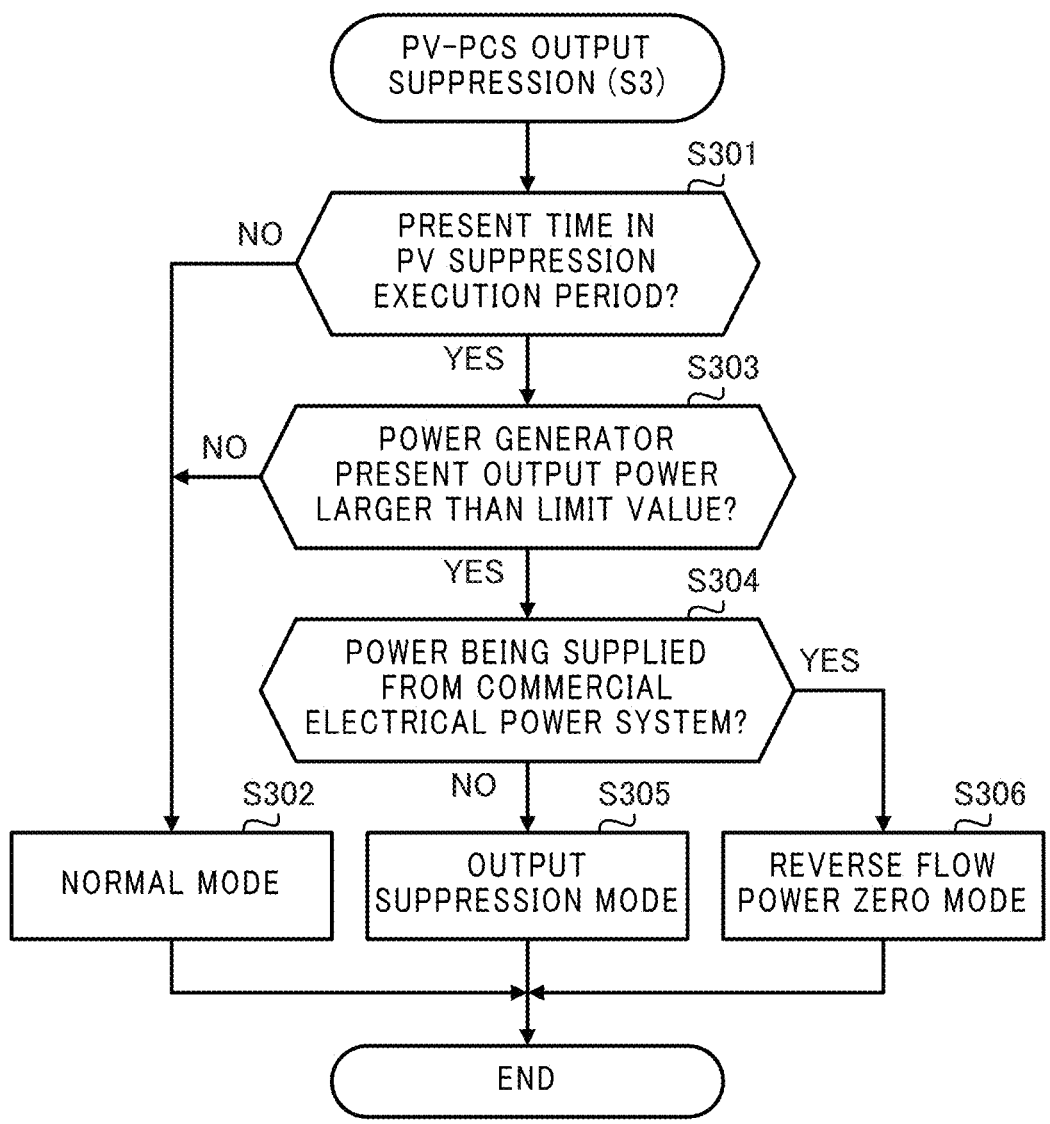
FIG. 13 is a flow chart illustrating an example of PV-PCS output suppression processing.

In the output suppression processing illustrated in FIG. 13, the PV-PCS 11 determines firstly whether the present time is included in an execution period of the PV suppression as designated in accordance with the suppression instruction (step S301). Further, if there is no suppression instruction, the determination of step S301 is NO.

When the present time is determined not to be included in the execution period of the PV suppression (NO in step S301), the PV-PCS 11 operates in a normal mode (step S302). The normal mode is a mode in which all generated power capable of being output, without suppression of output power from the power generator 6, is supplied to the home H or the commercial electrical power system 8. Thereafter, the PV-PCS 11 ends the output suppression processing.

However, when the present time is determined to be included in the execution period of the PV suppression (YES in step S301), the PV-PCS 11 secondly determines whether the output power Pg presently output from the power generator 6 is larger than a limit value (step S303).

If the determination is that the output power Pg presently output from the power generator 6 is not larger than the limit value (NO in step S303), such as when the power generation amount from sunlight is small due to cloudy weather or rain, for example, then output power Pg from the power generator 6 does not require suppression. Thus processing by the PV-PCS 11 goes to step S302, and the PV-PCS 11 operates in the normal mode.

However, if the determination is that the output power Pg presently output from the power generator 6 is larger than the limit value (YES in step S303), the PV-PCS 11 determines whether power is being supplied from the commercial electrical power system 8, that is to say, determines whether power is being purchased from the commercial electrical power system 8 (step S304). The PV-PCS 11 acquires the value of the power Pb calculated by the CT1, and determines whether the value of the power Pb is positive, thereby determining whether power is being supplied from the commercial electrical power system 8.

If the determination is that power is not being supplied from the commercial electrical power system 8 (NO in step S304), the PV-PCS 11 operates in an output suppression mode (step S305). The output suppression mode is a mode that suppresses the output power Pg from the power generator 6 to the limit value as instructed in accordance with the suppression instruction. Such operation corresponds to the case in which the total consumed power Pc of the home H is smaller than the limit value so that excess power is occurring, for example, as in the period P2 illustrated in FIG. 3. Thereafter, the PV-PCS 11 ends the output suppression processing.

If the determination is that power is being supplied from the commercial electrical power system 8 (YES in step S304), the PV-PCS 11 operates in a reverse flow power zero mode (step S306). The reverse flow power zero mode is a mode that adjusts the output power Pg from the power generator 6 so that the reverse flow power approaches zero as much as possible. Such operation corresponds to the case in which purchasing of power from the commercial electrical power system 8 is required when the total consumed power Pc of the home H is greater than the limit value so that excess power does not occur (such as in the period P3 illustrated in FIG. 3, for example), that is, when the output power Pg from the power generator 6 is suppressed to the limit value. In this case, the PV-PCS 11 adjusts the output power Pg from the power generator 6 so as to become equal to the total consumed power Pc. Thus the power Pb measured by the CT1 becomes as close as possible to zero so that power is neither purchased nor sold. Thereafter, the PV-PCS 11 ends the output suppression processing.

The overall processing of the energy management system 1 illustrated in FIG. 12 is further described below. Upon the control device 2 forwarding the suppression instruction acquired from the power server 14 to the power generator 6, the control device 2 determines whether there is arrival of a start time for the PV suppression (step S4). If the arrival of the start time for the PV suppression is pending (NO in step S4), the control device 2 waits until the arrival of the start time.

However, if there is arrival of the start time of the PV suppression (YES in step S4), the control device 2 executes PV suppression determination in accordance with the acquired suppression instruction (step S5). Details of the PV suppression determination processing executed in step S5 are illustrated in FIG. 14. This PV suppression determination processing is executed repeatedly in a fixed cycle when the solar output suppression coordinated control is set ON in the setting screen illustrated in FIG. 6 and there is arrival of the designated execution period for the PV suppression in accordance with the suppression instruction. The fixed cycle length, for example, is 30 minutes, which is the same incremental unit as that of the schedule of the PV suppression.

Figure 14:
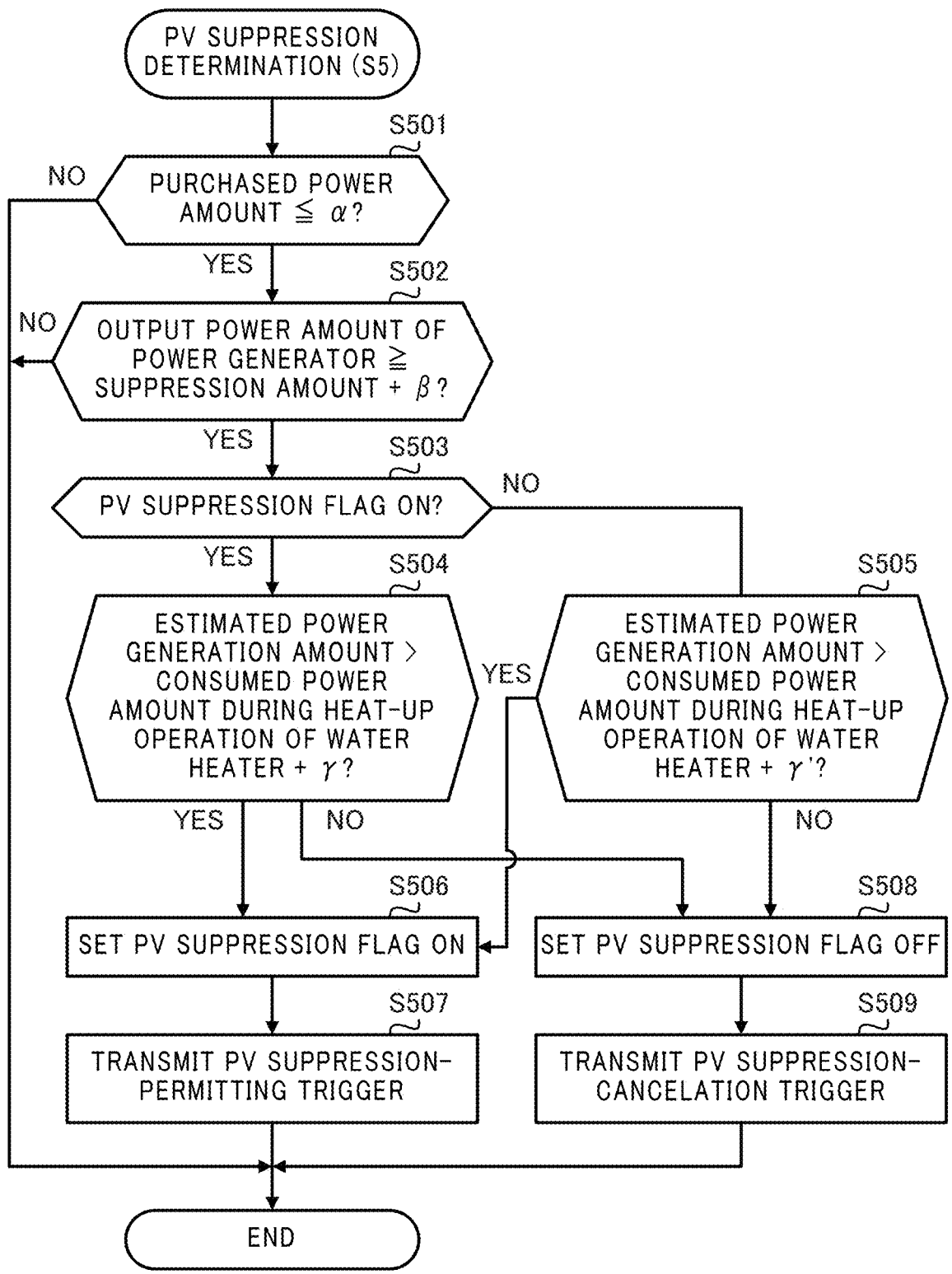
FIG. 14 is a flow chart illustrating an example of PV suppression determination processing executed by the control device.

In the PV suppression determination processing illustrated in FIG. 14, the controller 21 of the control device 2, as the first determination processing, determines whether the purchased power amount is presently less than or equal to the threshold $\alpha$, that is, whether power is substantially being purchased at present (step S501). The present purchased power amount is obtained by referring to the measurement value of the power Pb acquired by the measurement value acquirer 202 and last stored in the power database 40. The processing of step S501 determines whether the present time is included in the period D1 illustrated in FIG. 8.

If the determination is that power is not being substantially purchased at present (YES in step S501), the controller 21 determines, as the second determination processing, whether the present output power amount of the power generator 6 is greater than or equal to a value obtained by adding the threshold $\beta$ to the suppression amount, that is, whether the present output power amount of the power generator 6 substantially exceeds the suppression amount (step S502). The present output power amount of the power generator 6 is obtained by referring to the measurement value of the power Pg acquired by the measurement value acquirer 202 and last stored in the power database 40. Further, the suppression amount is a value expressed in power amount units by multiplying the limit value determined in accordance with the suppression instruction by the time of 30 minutes, which is the incremental unit of the schedule of the PV suppression. The processing of step S502 determines whether the present time is included in the period D2 illustrated in FIG. 8.

When the determination is that power is not presently being substantially purchased (NO in step S501), excess power is not occurring. Further, when the determination is that the output power amount of the power generator 6 presently is not substantially exceeding the suppression amount (NO in step S502), sale of power is occurring. Thus in this case causing operation of the water heater 5 is determined not be necessary, and the controller 21 ends the PV suppression determining processing.

If the determination in step S502 is that the output power of the power generator 6 at present substantially exceeds the suppression amount (YES in step S502), the controller 21 determines a presently set ON-OFF status of a PV suppression flag (step S503). The "PV suppression flag" is a flag indicating to the water heater 5 an instruction condition of the PV suppression, and is stored, for example, in the storage 22 of the control device 2. In the immediately prior PV suppression determination processing, the PV suppression flag is set ON when the PV suppression-permitting trigger is transmitted to the water heater 5, and is set OFF when the PV suppression-cancellation trigger is transmitted to the water heater 5. The below-described third determination processing of the controller 21 is executed using conditions that differ in accordance with the ON-OFF status of the PV suppression flag as presently set.

When the PV suppression flag is set ON (YES in step S503), the controller 21, as the third determination processing, determines whether the past actual power generation amount is larger than a value obtained by adding the threshold $\gamma$ to the consumed power amount of the home H during heat-up operation of the water heater 5 (step S504). The past actual power generation amount is the amount of the generated power Pa estimated by the generated power estimator 207, and as described previously, is obtained by acquiring the measurement value, for the previous C days, of the power Pg supplied to the home H from the power generator 6 in the time slot that is the same as the time slot specified for execution of the PV suppression. Further, the consumed power amount of the home H during the water heat-up operation of the water heater 5 is the amount of the power Pc' calculated by the consumed power calculator 206, and this consumed power amount is calculated in the aforementioned manner by subtracting the measurement value of the consumed power Pe of the water heater 5 from the measurement value of the total consumed power Pc of the home H stored in the database 40, and then adding the consumed power of the water heater 5 occurring when the water heater 5 performs the water heat-up operation.

Further, the past actual power generation amount used in the determination is fundamentally an estimate of the present actual power generation amount, and thus the threshold $\gamma$ is a margin for securing safety and is set such that the consumed power does not exceed the power generation amount that the power generator 6 is capable of outputting.

If the setting of the PV suppression flag is OFF (NO in step S503), the controller 21 determines, as the third determination processing, whether the past actual power generation amount is larger than a value obtained by adding a threshold $\gamma'$ to the consumed power amount of the home H during the water heat-up operation of the water heater 5 (step S505). That is to say, the controller 21 uses a threshold as the margin that differs in accordance with the ON-OFF status of the PV suppression flag as presently set.

Figure 15:
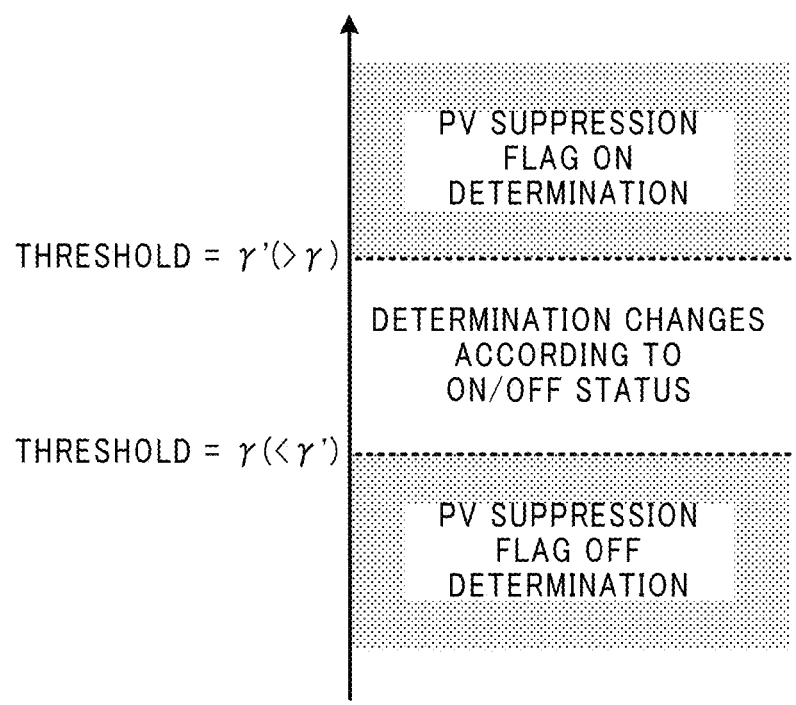
FIG. 15 is a diagram illustrating two thresholds used in the conditions for commanding the water heater to perform the water heat-up operation.

The threshold γ' is a margin for securing safety and is set, in the same manner as the threshold γ, such that the consumed power amount does not exceed the power generation amount capable of output from the power generator 6. The threshold γ' is set to a value larger than the threshold γ. Specifically, as illustrated in FIG. 15, the threshold γ' in the case in which the PV suppression flag is switched from OFF to ON is set to a value somewhat larger than the threshold γ in the case in which the PV suppression flag is switched from ON to OFF. This configuration provides hysteresis when switching between ON and OFF. This is a countermeasure against so-called "flutter", and is used for preventing frequent switching due to the PV suppression determination flag being set ON and OFF. In one example of threshold settings, the threshold γ is set to 0 Wh, and the threshold γ' is set to 200 Wh. Hereinafter, the threshold γ' is termed the first threshold, and the threshold γ is termed the second threshold.

More specifically, when the value obtained by adding the first threshold γ' to the total consumed power Pc' of the home H occurring when the water heater 5 performs the water heat-up operation is smaller than the generated power Pa generated by the power generator 6, the determination unit 205 determines that the water heater 5 is to be commanded to heat water. Then when the value obtained by adding the second threshold γ to the total consumed power Pc' of the home H occurring when the water heater 5 performs the water heat-up operation is larger than the generated power Pa generated by the power generator 6, the determination unit 205 determines that the water heater 5 is to be commanded to stop the water heat-up operation. The water heater controller 208, in accordance with the results of the determination by the determination unit 205, commands the water heater 5 to perform the water heat-up operation or stop the water heat-up operation.

By the processing of step S504 and step S505 in this manner, determination is made as to whether the present time is included in the period D4 illustrated in FIG. 8. In the case of determination, in step S504 and step S505, that the past actual power generation amount is larger than the value obtained by adding the predetermined γ or γ' to the consumed power amount of the home H during the water heat-up operation of the water heater 5 (YES in step S504, YES in step S505), the controller 21 sets the PV suppression flag ON (step S506). Then the controller 21 transmits the PV suppression-permitting trigger to the water heater 5 via the in-home communication device 24 (step S507).

In contrast, in the case of determination, in step S504 and step S505, that the past actual power generation amount is not larger than the value obtained by adding the predetermined γ or γ' to the consumed power amount of the home H during the water heat-up operation of the water heater 5 (NO in step S504, NO in step S505), the controller 21 sets the PV suppression flag OFF (step S508). Then the controller 21 transmits the PV suppression-cancelation trigger to the water heater 5 via the in-home communication device 24 (step S509).

Upon transmission of the PV suppression-permitting trigger or the PV suppression-cancelation trigger to the water heater 5, the controller 21 ends the PV suppression determination processing illustrated in FIG. 14.

The overall processing of the energy management system 1 illustrated in FIG. 12 is further described below. As a result of the PV suppression determination occurring in step S5, the water heater 5 receives the control command transmitted from the control device 2. Specifically, the control command is the PV suppression-permitting trigger or the PV suppression-cancelation trigger. Upon reception of the control command, the water heater 5 answers the control device 2 by a reply to the received control command (step S6).

Then the water heater 5 updates the heating-up mode in accordance with the received control command (step S7). Specifically, upon receiving the PV suppression-permitting trigger when the water heat-up operation is not in progress, the hot water supply controller 54 of the water heater 5 controls the heat pump unit 50 and performs the water heat-up operation. Further, upon receiving the PV suppression-cancelation trigger when the water heat-up operation is in progress, the hot water supply controller 54 controls the heat pump unit 50 and stops the water heat-up operation. Further, in the aforementioned manner, the hot water supply controller 54 sometimes does not operate in accordance with the received command.

Upon execution of the PV suppression determination in step S5 and transmission of the control command to the water heater 5, the control device 2 determines whether there is prior arrival of a completion time for the PV suppression (step S8). In the case in which the arrival of the completion time for the PV suppression is pending (NO in step S8), the processing of the control device 2 returns to step S5. Then the control device 2 executes the PV suppression determination at predetermined time intervals (for example, 30 minutes), and transmits to the water heater 5 the PV suppression-permitting trigger or the PV suppression-cancelation trigger in accordance with the determination result. However, upon arrival of the completion time of the PV suppression (YES in step S8), the processing illustrated in FIG. 12 ends.

In the energy management system 1 in accordance with the present embodiment as described above, when the predetermined first through third conditions are satisfied in the execution period of the PV suppression, the control device 2 commands the water heater 5 to heat water. Such operation enables a lowering of the power generation loss occurring during the PV suppression and enables improvement of the utilization efficiency of power.

During such operation, the generated power Pa of the power generator 6 occurring in the execution period of the PV suppression is estimated by the control device 2 to be the measurement value of the power Pg supplied to the home H from the power generator 6 occurring on a day prior to the day of execution of the PV suppression. Due to use of the actual past power generation amount, the generated power Pa of the power generator 6 occurring in the execution period of the PV suppression can be estimated with high precision without incurring a high calculation expense.

Further, in the case in which the consumed power Pc' of the home H occurring when the water heater 5 performs the water heat-up operation in the execution period of the PV suppression is smaller than the generated power Pa, the control device 2 commands the water heater 5 to heat water. In other words, the control device 2 compares the consumed power Pc' of the home H in the case in which the water heater 5 performs the water heat-up operation and the generated power Pa that the power generator 6 is capable of outputting, obtains an estimate of how much the consumption amount consumed by the water heater 5 can be increased, and then commands the water heater 5 to heat water. As a result, without the occurrence of power purchasing, the water heater 5 can be made to perform the water heat-up operation at a power corresponding to the power generation loss. Particularly in the case in which there is a contract for time slot-specific fees, the power unit price is generally high in the daytime when the PV suppression is executed, and thus economic losses can be effectively decreased by not allowing the occurrence of power purchasing.

Modified Example

Although an embodiment of the present disclosure is described above, modifications and applications based on various aspects are possible in implementing the present disclosure.

For example, in the aforementioned embodiment, the water heater controller 208 commands the water heater 5 to perform the water heat-up operation in the case in which all of the predetermined first condition through third condition are satisfied in the execution period of the PV suppression. However, the water heater controller 208 may command the water heater 5 to perform the water heat-up operation in the case in which only one or two of the conditions is satisfied among the first condition through third condition.

For example, in the case in which only the third condition is satisfied in the execution period of the PV suppression, that is, in the case in which the consumed power Pc' of the home H occurring when the water heater 5 performs the water heat-up operation is less than the generated power Pa of the power generator 6, the water heater controller 208 may command the water heater 5 to perform the water heat-up operation. In this case, the water heater controller 208 commands the water heater 5 to heat water in the period D3 from the time B to the time E (E') occurring in the FIG. 8. This period D3 includes the period of purchasing of power from the time B to the time D (D'). Thus this aspect is effective in the case of prioritization of the decreasing of the power generation loss over the economic effect of power sales.

Further, in the case in which only the first condition is satisfied in the execution period of the PV suppression, that is, in the case in which power from the commercial electrical power system 8 is not being supplied to the home H, the water heater controller 208 may command the water heater 5 to perform the water heat-up operation. In this case, the water heater controller 208 commands the water heater 5 to heat water in the period D1 from the time A to the time F occurring in FIG. 8. Alternatively, the predetermined condition for commanding the water heater 5 to heat water may be satisfied in the case in which the second condition alone is satisfied, the first condition and the third condition are both satisfied, the first condition and the second condition are both satisfied, or the second condition and the third condition are both satisfied. In this manner, whatever the type of condition that is satisfied, the water heater controller 208 can determine, variously in accordance with user desires, conditions, or the like, whether to command the water heater 5 to heat water.

Further, in the aforementioned embodiment, the generated power estimator 207 estimates the generated power Pa occurring in the execution period of the PV suppression as the measurement value of the power Pg supplied to the home H from the power generator 6 on the day prior to the day of execution of the PV suppression. However, the generated power estimator 207 may estimate the generated power Pa at the time of the PV suppression without using the measurement value. For example, the generated power estimator 207 can estimate the generated power Pa occurring in the execution period of the PV suppression on the basis of information such as the weather, season, and the like during the execution period of the PV suppression.

Further, in the aforementioned embodiment, the generated power Pa occurring at the time of day when the PV suppression is executed is estimated by the generated power estimator 207 as the maximum value among the measurement values acquired in the previous C days by the measurement value acquirer 202 at each time included in the specified time slot in which the PV suppression is executed. However, in numerous cases the generated power Pa is actually smaller than the past maximum value even when PV suppression is in progress. Thus the generated power estimator 207 may estimate the generated power Pa to be a value obtained by correcting the maximum value amount of the measurement values acquired in the previous C days. For example, the generated power estimator 207 may estimate, as the generated power Pa occurring in each period of the day of execution of the PV suppression, a value obtained by multiplying the maximum value among the measurement values acquired in the previous C days times a predetermined correction coefficient such as 0.95, 0.9, or the like.

Further, the power generator 6 is arranged at the home H in the aforementioned embodiment. However, the power generator 6 may be arranged on grounds separated from the home H, and the power may be supplied from a location remote from the home H, as long as the power generator 6 is a power system separate from the commercial electrical power system 8. In this case, the location at which the power generator 6 is arranged is included in the meaning of the term "power-consuming area". Further, the term "power-consuming area" is not limited to a general household as in the aforementioned home H, but may be collective housing, a facility, a building, a factory, or the like, as long as the power-consuming area consumes power from the power generator 6 and the commercial electrical power system 8.

Further, in the aforementioned embodiment, the power measurement device 4 measures the power Pb, Pg, and Pe sent through the power lines D1 to D3, and transmits the measurement values of such power to the control device 2. Further, the control device 2 forwards to the PV-PCS 11 of the power generator 6 the measurement values of the power Pb, Pg, and Pe acquired from the power measurement device 4. However, the power measurement device 4 may directly transmit to the PV-PCS 11 the measurement values of the power Pb, Pg, and Pe. Further, a device other than the power measurement device 4 may measure the power. For example, the PV-PCS 11 of the power generator 6 may be connected through a communication line to the CT2 arranged at the power line D2, and the power Pg output from the power generator 6 may be measured. Further, the hot water supply controller 54 of the water heater 5 may be connected via a communication line with the CT3 arranged at the power line D3, and the power Pe consumed by the water heater 5 may be measured. Measurement in this manner enables appropriate transmission through the wireless network installed in the home H and enables shared use among the various apparatuses.

Further, in the aforementioned embodiment, the instruction for PV suppression distributed from the power server 14 is sent to the control device 2 and is forwarded from the control device 2 to the PV-PCS 11. However, the instruction for the PV suppression may be transmitted directly to the PV-PCS 11. In this case, by the PV-PCS 11 transmitting to the control device 2 the contents of the instruction for the PV suppression, the instruction acquirer 201 of the control device 2 acquires information such as the schedule, limit value, and the like of the PV suppression.

Further, in the aforementioned embodiment, the case is described in which the control 2 is arranged in the home H.

Figure 16:
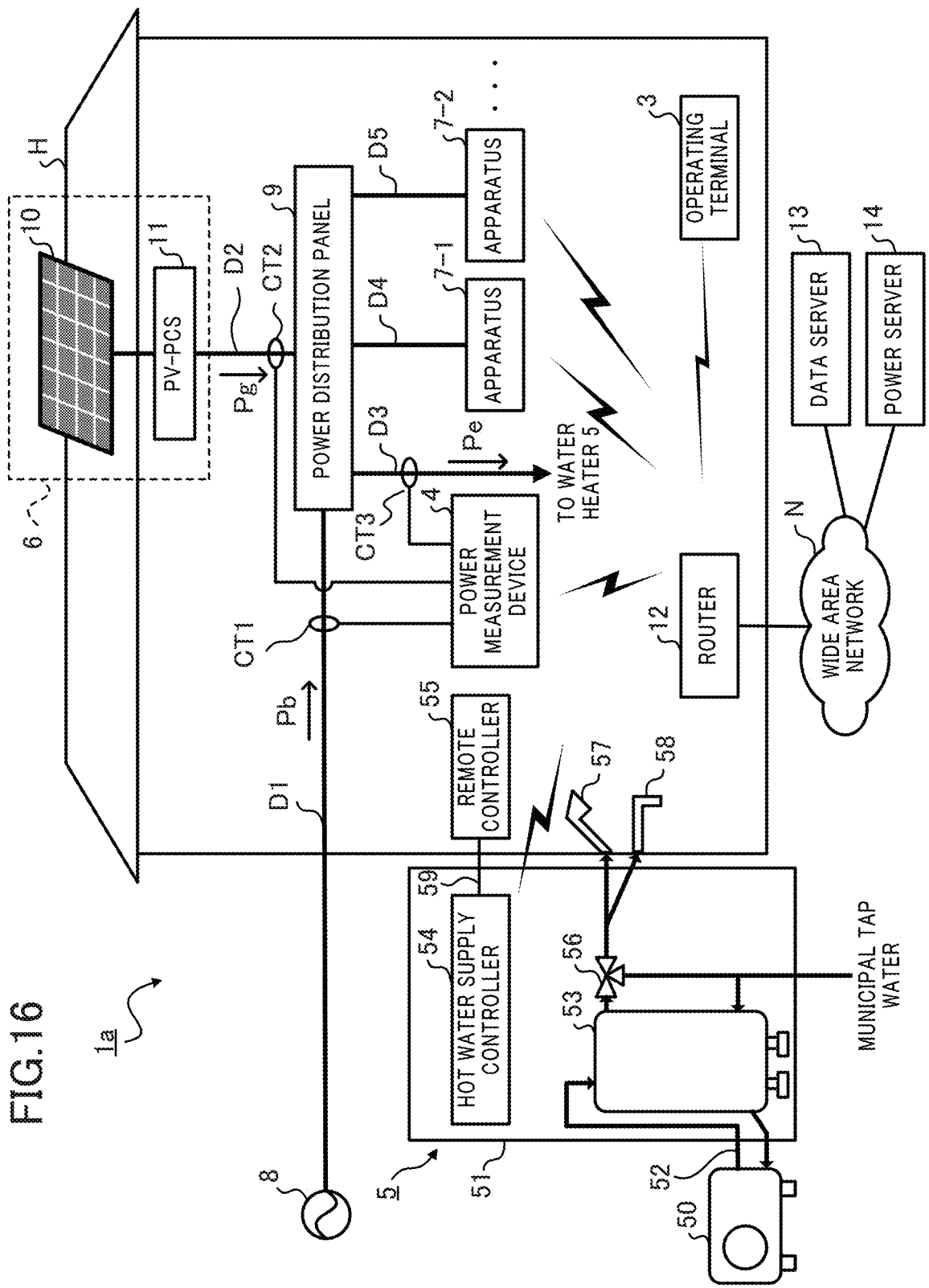
FIG. 16 is a block diagram illustrating an overall configuration of an energy management system according to a modified example.

However, in the present disclosure, a device having functions equivalent to the control device 2 may be arranged outside the home H. FIG. 16 illustrates an example of such an energy management system 1a. In the energy management system 1a illustrated in FIG. 16, the control device 2 is not arranged in the home H. In place of the control device 2, a router 12 is connected in a communication-capable manner with each of the operating terminal 3, the power measurement device 4, the water heater 5, the power generator 6, and the apparatus 7, and the router 12 relays the transmissions occurring between each of the apparatuses. Further, the router 12 and the data server 13 operate together to perform the role of the control device 2. Alternatively, the router 12 may be incapable of communication with some of the apparatuses within the home H. For example, a configuration may be used in which the router 12 and the water heater 5 are not connected in a communication-capable manner, and the power generator 6 relays communication between the router 12 and the water heater 5. By omission of the control device 2 in this manner, the configuration of the energy management system 1a can be simplified due to the ability to reduce the number of the apparatuses arranged in the home H.

In the aforementioned embodiment, the operating terminal 3 is equipped with the display and the input device, and the control device 2 acquires via wireless or wired communication the input information input to the operating terminal 3, and transmits display information to the operating terminal 3. However, in the present disclosure, the control device 2 may be equipped with the display and the input device. That is to say, the control device 2 may be equipped with the functions of the operating terminal 3. In this case, the setting information receiver receives the setting input from the user via the input device with which the control device 2 is equipped, and not via the operating terminal 3. Further, the display controller displays the user information via the display with which the control device 2 is equipped, and not via the operating terminal 3.

In the aforementioned embodiment, the controller 21 of the control device 2, by the CPU executing programs stored in the ROM or storage 22, performs the functions of each of the terminal communicator 200, the instruction acquirer 201, the measurement value acquirer 202, the relay unit 203, the determination unit 205, the consumed power calculator 206, the generated power estimator 207, and the water heater controller 208. However, in the present disclosure, the controller 21 may be dedicated hardware. The term "dedicated hardware" means, for example, a single circuit, a composite circuit, a programmed processor, an application specific integrated circuit (ASIC), a field-programmable gate array (FPGA), combinations thereof, or the like. When the controller 21 is dedicated hardware, the functions of each unit may be achieved by separate respective hardware, or may be achieved collectively by a single hardware unit.

Further, among each of the functions, a portion may be achieved using dedicated hardware, and the other portion may be achieved by software or firmware. In this manner, the controller 21 can achieve the aforementioned various functions by hardware, software, firmware, or a combination of such.

An operating program specifying the operations of the control device 2 according to the present disclosure can be used with an existing personal computer, information terminal device, or the like, thereby enabling the personal computer, information terminal device, or the like to function as the control device 2 according to the present disclosure.

Further, any method may be used for distribution of such a program, and for example, the program may be stored in a computer-readable recording medium such as a compact disc read-only memory (CD-ROM), a digital versatile disc (DVD), a magneto-optical (MO) disc, a memory card, or the like, and the computer-readable recording medium storing the program may be distributed through a communication network such as the Internet.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can be used with advantage for a system and the like performing control of power.

REFERENCE SIGNS LIST 1, 1a Energy management system
2 Control device
3 Operating terminal
4 Power measurement device
5 Water heater
6 Power generating equipment
7, 7-1, 7-2, . . . Equipment unit
8 Commercial electrical power system
9 Power distribution panel
10 PV panel
11 PV-PCS
12 Router
13 Data server
14 Power server
21 Controller
22 Storage
23 Timer
24 In-home communication device
25 Outside-home communication device
29 Bus
31 PV suppression graphic
32 Coordinated control graphic
40 Power database
50 Heat pump unit
51 Tank unit
52 Piping
53 Hot water storage tank
54 Hot water supply controller
55 Remote controller
56 Mixing valve
57 Shower
58 Faucet
59 Communication line
200 Terminal communicator
201 Instruction acquirer
202 Measurement value acquirer
203 Relay unit
205 Determination unit
206 Consumed power calculator
207 Generated power estimator 208 Water heater controller
210 Instruction storage
220 Measurement value storage
230 Setting storage
D1 to D5 Power line
H Home
N Wide area network

The invention claimed is:

1. A control method for a water heater comprising:
    acquiring an instruction to suppress in a specified period supplying of a generated power generated by a power generator installed in a power-consuming area to a commercial electrical power system;
    estimating, upon acquiring the instruction, the generated power during a lost power occurring in the specified period, based on a measurement value of a power output from the power generator in a period prior to the specified period; and
    commanding a water heater installed in the power-consuming area to perform a water heat-up operation when a predetermined condition is satisfied during the lost power occurring in the specified period, wherein
    the power generator comprises a photovoltaic panel and a power conditioning system,
    the lost power (i) occurs due to the power conditioning system suppressing the power output from the power generator in the specified period and (ii) indicates power decrease, of total consumed power relative to generated power capable of being output, and is an amount of the power which is not output from the power conditioning system to either of the commercial electrical power system or the power-consuming area while the power is being generated by the photovoltaic panel, and
    the predetermined condition is satisfied when a consumed power of the power-consuming area forecast for when the water heater performs the water heat-up operation is smaller than the estimated generated power.

2. The control method according to claim 1, wherein the predetermined condition is satisfied when the power output from the power generator is larger than a limit value determined in accordance with the instruction, and the consumed power of the power-consuming area forecast for when the water heater performs the water heat-up operation is smaller than the generated power which is estimated.

3. The control method according to claim 1, wherein the predetermined condition is satisfied when a power is not supplied from the commercial electrical power system to the power-consuming area, and the consumed power of the power-consuming area forecast for when the water heater performs the water heat-up operation is smaller than the generated power estimated by the generated power estimator.

4. The control method according to claim 1, wherein the predetermined condition is satisfied when (i) a power is not supplied from the commercial electrical power system to the power-consuming area, (ii) the power output from the power generator is larger than a limit value determined in accordance with the instruction, and (iii) the consumed power of the power consuming area forecast for when the water heater performs the water heat-up operation is smaller than the generated power which is estimated.

5. The control method according to claim 1, further comprising:
    acquiring the measurement value of the power output from the power generator in the period prior to the specified period, wherein
    the estimating estimates, based on the measurement value acquired by the first measurement value acquirer, the generated power during the lost power occurring in the specified period.

6. The control method according to claim 5, wherein
    the specified period is a specified time slot occurring on a specified day, and
    acquiring, in a time slot that is the same time of day as the specified time slot and occurs on a day prior to the specified day, the measurement value of the power output from the power generator.

* * * * *